United States Patent
Matsui et al.

(10) Patent No.: US 7,253,822 B2
(45) Date of Patent: Aug. 7, 2007

(54) PICTURE DISPLAYING APPARATUS, PICTURE DISPLAYING METHOD, PICTURE DISPLAYING PROGRAM, AND COMPUTER READABLE RECORD MEDIUM CONTAINING THE PICTURE DISPLAYING PROGRAM

(75) Inventors: Takayuki Matsui, Inagi (JP); Yutaka Katsumata, Inagi (JP); Shinichi Eguchi, Inagi (JP); Sumiko Tanabe, Inagi (JP); Yuuji Nomoto, Inagi (JP)

(73) Assignees: Fujitsu Limited, Kawasaki (JP); Fujitsu Frontech Limited, Tokyo (JP)

( * ) Notice: Subject to any disclaimer, the term of this patent is extended or adjusted under 35 U.S.C. 154(b) by 0 days.

(21) Appl. No.: 10/895,349

(22) Filed: Jul. 21, 2004

(65) Prior Publication Data

US 2005/0204299 A1   Sep. 15, 2005

(30) Foreign Application Priority Data

Mar. 10, 2004 (JP) .............................. 2004-067611

(51) Int. Cl.
G09G 5/00 (2006.01)
(52) U.S. Cl. ...................... 345/629; 715/784; 345/654
(58) Field of Classification Search ................ 345/629, 345/632, 634, 636
See application file for complete search history.

(56) References Cited

U.S. PATENT DOCUMENTS

| | | | | |
|---|---|---|---|---|
| 6,661,425 B1 * | 12/2003 | Hiroaki | .................... | 345/629 |
| 6,831,661 B1 * | 12/2004 | Itoh et al. | ................... | 345/629 |
| 6,880,122 B1 * | 4/2005 | Lee et al. | .................. | 715/500 |
| 6,888,577 B2 * | 5/2005 | Waki et al. | ................. | 348/589 |

FOREIGN PATENT DOCUMENTS

| | | |
|---|---|---|
| JP | HEI 64-72270 | 3/1989 |
| JP | HEI 2-197918 | 8/1990 |
| JP | HEI 3-226862 | 10/1991 |
| JP | HEI 6-149890 | 5/1994 |
| JP | HEI 7-65026 | 3/1995 |
| JP | HEI 7-168844 | 7/1995 |
| JP | HEI 7-168927 | 7/1995 |
| JP | HEI 7-230470 | 8/1995 |
| JP | HEI 7-253769 | 10/1995 |
| JP | HEI 7-271819 | 10/1995 |
| JP | HEI 8-36583 | 2/1996 |
| JP | HEI 8-77195 | 3/1996 |
| JP | HEI 8-87519 | 4/1996 |
| JP | 2000-270299 | 9/2000 |
| JP | 2003-131654 | 5/2003 |

* cited by examiner

Primary Examiner—Mark Zimmerman
Assistant Examiner—David Chu
(74) Attorney, Agent, or Firm—Staas & Halsey LLP

(57) ABSTRACT

A picture displaying apparatus comprises a storing unit storing a plurality of pictures, a displaying unit displaying the picture, an aimed region designating unit designating a partial region on the picture as an aimed region, an image cutting-out unit cutting-out the aimed region from each of the pictures as an aimed region picture, and a display controlling unit displaying the aimed region picture on the displaying unit. The display controlling unit comprises a superposed picture forming unit superposing a plurality of the aimed region pictures to form a superposed picture, and a visual effect controlling unit displaying each of the aimed region pictures forming the superposed picture at a predetermined transparency on the displaying unit. Even when a specific picture is retrieved in a large amount of pictures in the same or almost the same form, visual retrieval is possible readily and certainly without decreasing the retrieval efficiency.

24 Claims, 19 Drawing Sheets

FIG. 8

AIMED REGION SETTING PROPERTY SCREEN

| POSITION | ABSOLUTE COORDINATES | RELATIVE COORDINATES |
|---|---|---|
| X: | X1 | ±x1 |
| Y: | Y1 | ±y1 |

SIZE
X:  X2
Y:  Y2

OK

REFERENCE POINT

CANCEL

ITEM: REQUESTED DISPATCH DATE ▼
TOP LEFT-HAND CORNER OF PAPER (EDGE POSITION)
TOP RIGHT-HAND CORNER OF PAPER (EDGE POSITION)
BOTTOM LEFT-HAND CORNER OF PAPER (EDGE POSITION)
BOTTOM RIGHT-HAND CORNER OF PAPER (EDGE POSITION)
⋮
ITEM: REQUESTED DISPATCH DATE
ITEM: DISPATCH DATE
⋮

FIG. 15

```
STOP CONDITION SETTING PROPERTY SCREEN

ABSOLUTE      RELATIVE
POSITION      COORDINATES   COORDINATES
   X:            X1            ±x1
   Y:            Y1            ±y1

SIZE
   X:   X2
   Y:   Y2                              ┌────────┐
                                        │   OK   │
                                        └────────┘
REFERENCE POINT
┌──────────────────────────────┐        ┌────────┐
│ ITEM: REQUESTED DISPATCH DATE ▼│       │ CANCEL │
└──────────────────────────────┘        └────────┘
STOP CONDITION
┌──────────────────────────────┐
│ FIGURE: WITHIN RANGE         ▼│
└──────────────────────────────┘

┌────────────┐     ┌────────────┐
      │  20030101  │  ~  │  20031231  │
      └────────────┘     └────────────┘
```

PICTURE DISPLAYING APPARATUS, PICTURE DISPLAYING METHOD, PICTURE DISPLAYING PROGRAM, AND COMPUTER READABLE RECORD MEDIUM CONTAINING THE PICTURE DISPLAYING PROGRAM

BACKGROUND OF THE INVENTION

1) Field of the Invention

The present invention relates to an image displaying apparatus, an image displaying method, an image displaying program and a computer readable record medium containing the image displaying program suited to successively display image data of a plurality of pictures on a screen of a display or the like.

2) Description of the Related Art

Heretofore, there is a technique wherein a plurality of pictures (for example, documents, photographs or the like) are read out by a picture reading apparatus such as a scanner or the like and converted into electronic data, and the obtained picture image data of the plural pictures (hereinafter, referred simply to as pictures) are successively displayed on a display unit such as a display or the like as if pages are turned over, whereby the user can visually retrieve a specific picture (hereinafter referred to as a picture to be retrieved) in the image data of the plural pictures.

In relation to the above technique, there have been proposed approaches wherein pictures are displayed at high speed in order to improve the picture retrieval efficiency (refer to patent documents 1 through 3 below).

For example, there is proposed in the patent document 1 an approach wherein pictures is thinned out or the fineness (resolution) of the picture is set to a predetermined fineness to decrease the volume of the picture, whereby the display speed for the picture is improved. In the patent document 2, there is proposed an approach wherein the resolution for pictures is degraded, whereby the display speed for the pictures is improved.

In the patent document 3, there is proposed an approach wherein picture expansion of only a specific area showing a characteristic of a picture to be retrieved (that is, a specific picture desired to be obtained in retrieval) is designated when arbitrary pictures are displayed at high speed, the other areas are displayed blank, and pictures on which only the specific area is expanded are displayed on a display unit to carry out retrieval.

[Patent Document 1] Japanese Patent Laid-Open No. HEI 8-077195

[Patent Document 2] Japanese Patent Laid-Open No. 2000-270299

[Patent Document 3] Japanese Patent Laid-Open No. HEI 7-271819

The approaches disclosed in the above patent documents 1 and 2 can be applied when a specific picture is retrieved in a plurality of pictures having clear differences in appearance that one can recognize at a glance. However, when a specific picture is retrieved in a plurality of analogous pictures in the same or almost same form such as slips in the same form, for example, it is difficult to retrieve the specific picture among them because the analogous picture are turned at high speed. In such case, the approaches disclosed in the patent documents 1 and 2 do not allow easy retrieval of a picture that is a target in retrieval.

when a specific slip is retrieved in a plurality of slips in the same form, that is, when a slip put a specific date or a slip in which one of items is corrected is retrieved in a plurality of slips in the same form, it becomes difficult to retrieve the target slip if the plural slips are turned at high speed using the approaches disclosed in the above patent documents 1 and 2. Further, if the slips are turned at a speed exceeding the redraw rate (the so-called refresh rate), there can occur the so-called frame drop that a picture is changed to the next picture before display of the picture is not yet completed, which causes difficulty in visual retrieval.

The approach disclosed in the above patent document 3 simultaneously displays a plurality of pictures having only a specific area which shows a characteristic part of a picture to be retrieved on a display unit, thereby retrieving the picture that is the target in retrieval in the analogous plural pictures in the same or almost the same form without being disturbed by the other similar portions of the plural pictures.

Since the approach disclosed in the patent document 3 simultaneously displays a plurality of pictures on the display unit to allow the user to visually retrieve a picture, the user has to move his/her eyes to visually retrieve the picture that is the target in retrieval in a plurality of pictures. For this, the retrieval speed largely depends on the user, the visibility of the user degrades as compared with the approach wherein the user fixes his/her eyes on one position to retrieve, which causes a danger that the user overlooks the image to be retrieved.

When the user retrieves a large amount of pictures, the load on the user is increased. In order to improve the efficiency of retrieval, it is alternatively possible to increase the number of pictures simultaneously displayed on the display unit. However, when the number of pictures simultaneously displayed is increased, each picture displayed on the display unit is decreased in size, which leads to degradation of the visibility.

SUMMARY OF THE INVENTION

In the light of the above disadvantages, an object of the present invention is to provide a picture displaying apparatus, a picture displaying method, a picture displaying program and a computer readable record medium containing the picture displaying program, which allow the user to visually retrieve easily and certainly without degrading the efficiency of retrieval even when the user retrieves a specific picture in a large amount of pictures in the same or almost the same form.

The present invention therefore provides a picture displaying apparatus comprising a storing unit for storing a plurality of pictures, a displaying unit for displaying at least one picture among the plural pictures, an aimed region designating unit for designating a partial region on the picture as an aimed region, an image cutting-out unit for cutting out the aimed region designated by the aimed region designating unit as an aimed region picture from each of the plural pictures, a display controlling unit for displaying the aimed region pictures of the plural pictures cut out by the image cutting-out unit on the displaying unit, the display controlling unit comprising a superposed picture forming unit for forming a superposed picture by superposing a plurality of the aimed region pictures cut out by the image cutting-out unit, and a visual effect controlling unit for displaying each of the aimed region pictures forming the superposed picture formed by the superposed picture forming unit at a predetermined transparency on the aid displaying unit.

It is preferable that the superposed picture forming unit forms the superposed picture by superposing a predetermined number of the aimed region pictures expanded in different layers, respectively. Further, it is preferable that the display controlling unit comprises an image changing controlling unit for changing the aimed region pictures forming the superposed picture by adding a new aimed region picture to the superposed picture and discarding the oldest aimed region picture among the plural aimed region pictures forming the superposed picture.

It is preferable that, when the image changing controlling unit changes the aimed region pictures forming the superposed picture, the image changing controlling unit adds a new aimed region picture and changes step-wisely the layer of each of the aimed region pictures forming the superposed picture, and the visual effect controlling unit sets step-wisely the transparency of each of the aimed region pictures according to a corresponding layer.

It is preferable that the picture displaying apparatus further comprises a picture specifying instructing unit for stopping changing of the aimed region pictures forming the superposed picture by the image changing controlling unit, and controlling to display a desired aimed region picture on the displaying unit.

It is preferable that the visual effect controlling unit enlarges the superposed picture and displays the same on the displaying unit.

The present invention further provides a picture displaying method for displaying a picture on a displaying unit in a picture displaying apparatus comprising a storing unit for storing a plurality of pictures and the displaying unit for displaying at least one picture among the plural pictures, the picture displaying method comprising the steps of an aimed region designating step of designating a partial region on the picture as an aimed region, an image cutting-out step of cutting out the aimed region designated at the aimed region designating step as an aimed region picture from each of the plural pictures, a display controlling step of displaying the aimed region pictures of the plural pictures cut out at the image cutting-out step on the displaying unit, the displaying controlling step comprising a superposed picture forming step of forming a superposed picture by superposing a plurality of the aimed region pictures cut out at the image cutting-out step, and a visual effect controlling step of displaying each of the aimed region pictures forming the superposed picture formed at the superposed picture forming step at a predetermined transparency on the displaying unit.

It is preferable that the superposed picture forming step is a step of forming the superposed picture by superposing a predetermined number of the aimed region pictures expanded in different layers, respectively, and the display controlling step comprises an image changing controlling step of changing the aimed region pictures forming the superposed picture by adding a new aimed region picture to the superposed picture and discarding the oldest aimed region picture among the plural aimed region pictures forming the superposed picture.

It is preferable that, when said aimed region pictures forming said superposed picture are changed at said image changing controlling step, a new aimed region picture is added, and the layer of each of the aimed region pictures forming the superposed picture is step-wisely changed, and a transparency of each of the aimed region pictures is step-wisely set according to a corresponding layer at the visual effect controlling step.

The present invention still further provides a picture displaying program for making a computer execute a function of displaying a picture on a displaying unit in a picture displaying apparatus comprising a storing unit for storing a plurality of pictures and the displaying unit for displaying at least one picture among said plural pictures, the picture displaying program making the computer function as an aimed region designating unit for designating a partial region on the picture as an aimed region, an image cutting-out unit for cutting out the aimed region designated by the aimed region designating unit as an aimed region picture from each of the plural pictures, a display controlling unit for displaying the aimed region pictures of the plural pictures cut out by the image cutting-out unit on the displaying unit, when the picture displaying program makes the computer function as the display controlling unit, the picture displaying program making the computer function as a superposed picture forming unit for forming a superposed picture by superposing a plurality of the aimed region pictures cut out by the image cutting-out unit, and a visual effect controlling unit for displaying each of the aimed region pictures forming the superposed picture formed by the superposed picture forming unit at a predetermined transparency on the displaying unit.

To attain the above object, a computer readable record medium according to this invention contains the above picture displaying program.

According to the picture displaying apparatus, picture displaying method, picture displaying program and the computer readable record medium containing the picture displaying program of this invention, a plurality of cut-out aimed region pictures are superposed to form a superposed picture, and each of the aimed region pictures forming the superposed picture is displayed at a predetermined transparency on the displaying unit. This enables the user to visually retrieve a target picture in a large amount of pictures in the same or almost the same form by visually retrieve in the superposed picture. Additionally, the user can retrieve at a time in a plurality of pictures, which improves the retrieval efficiency. The user needs to look at only the superposed picture formed by superposing characteristic parts (aimed regions) of pictures among which a target picture is present, which can prevent degradation of the visibility for the user who visually retrieves.

According to this invention, a predetermined number of aimed region pictures, each of which is expanded in a different layer, are superposed to form a superposed picture, and when the aimed region pictures forming the superposed picture are changed, a new aimed region picture is added to the superposed picture, while the oldest aimed region picture among the plural aimed region pictures forming the superposed picture is discarded. Accordingly, it is possible to successively add aimed region pictures to the superposed picture, which further improve the retrieval efficiency.

Since only aimed region pictures are handled, it is possible to decrease the amount of data to be handled as compared with a case where whole pictures are handled. This enables high-speed display (changing) while keeping the easy-to-look picture quality, without degrading the resolution of the pictures or thinning out the pictures, that is, without degrading the picture quality of the displayed pictures (superposed picture).

According to this invention, when the aimed region pictures forming the superposed picture are changed, a new aimed region picture is added and the layer of each of the aimed region pictures forming the superposed picture is step-wisely changed, and the transparency of each of the aimed region pictures is step-wisely set according to a corresponding layer. Accordingly, the aimed region picture of the superposed picture does not immediately disappear and cannot be seen, but is kept displayed like an afterimage at a gradually-increased transparency for a predetermined period of time. This enables the user to be able to visually retrieve very easily, and is advantageous to avoid a phenomenon such as drop frame or the like from occurring. Thus, the user can visually retrieve certainly.

The picture displaying apparatus of this invention has a picture specifying instructing unit for stopping changing of the aimed region pictures forming the superposed picture, and controlling to display a desired aimed region picture on the displaying unit. Thus, it becomes possible to certainly retrieve a target picture and specify the same.

Since the picture displaying apparatus of this invention enlarges the superposed picture and displays the same, the visibility is further improved.

BRIEF DESCRIPTION OF THE DRAWINGS

FIG. 8 is a typical diagram showing an aimed region setting property screen displayed on the displaying unit in the picture displaying apparatus and the picture displaying method according to the first embodiment of this invention;

FIG. 15 is a typical diagram showing a stop condition setting property screen displayed on the displaying unit in the picture displaying apparatus and the picture displaying method according to the third embodiment of this invention;

DESCRIPTION OF THE PREFERRED EMBODIMENTS

Hereinafter, description will be made of embodiments of the present invention with reference to the accompanying drawings.

(1) First Embodiment

Figure 1:
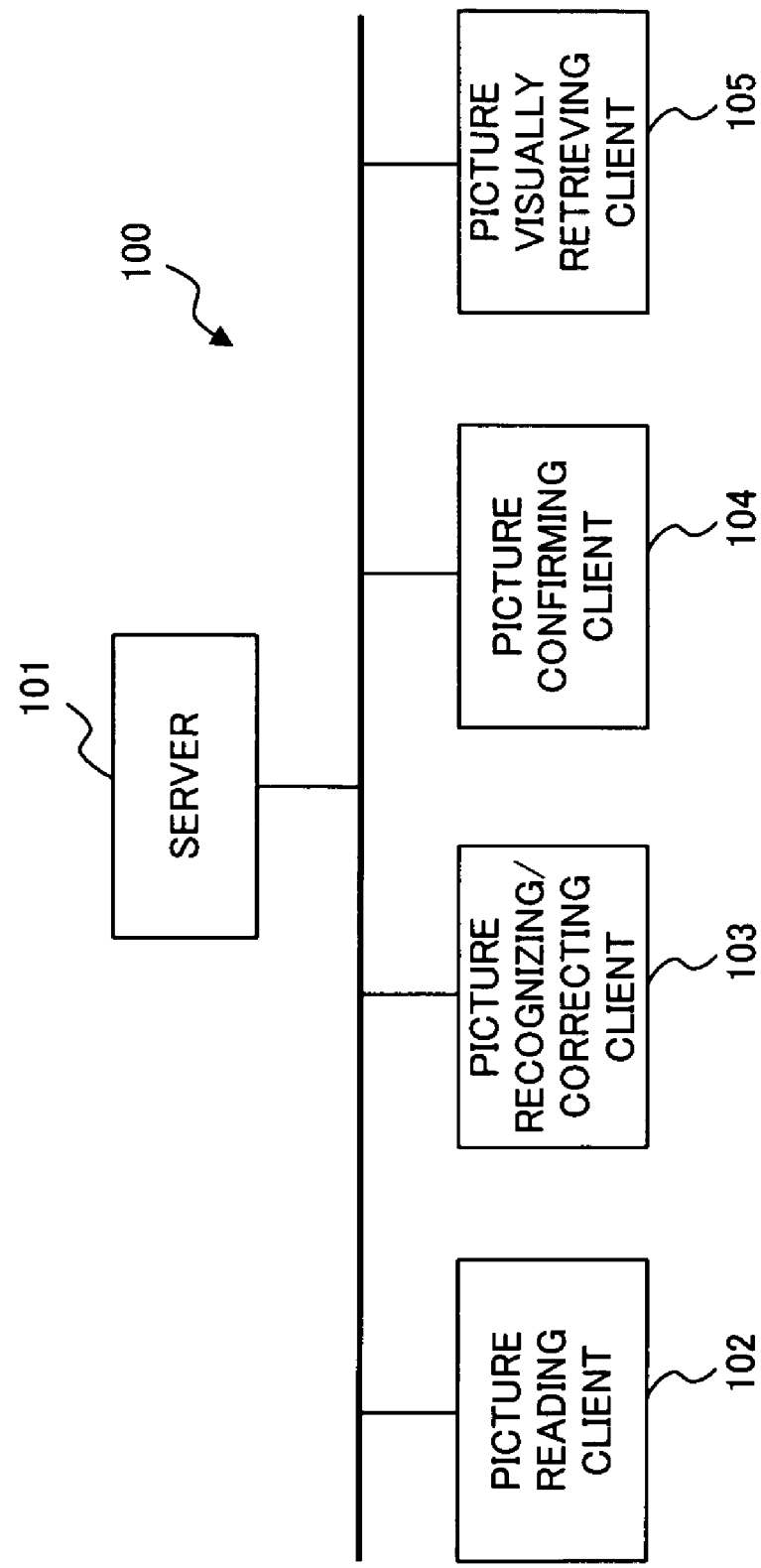
FIG. 1 is a block diagram showing a structure of clients of a picture retrieval system to which a picture displaying apparatus and a picture displaying method according to a first embodiment of this invention is applied.

First, description will be made of a picture retrieval system to which a picture displaying apparatus and a picture displaying method according to a first embodiment of this invention are applied. FIG. 1 is a block diagram showing clients configuring the picture retrieval system to which the picture displaying apparatus and the picture displaying method according to the first embodiment are applied.

As shown in FIG. 1, the picture retrieval system 100 is a system for retrieving image data of a specific picture in image data of a plurality of pictures. The picture retrieval system 100 comprises a server 101 including a storing unit for storing image data of a plurality of pictures, a picture reading client 102, which is configured with a so-called optical character reader (OCR apparatus: Optical Character Recognition apparatus), for reading a plurality of pictures (documents, photographs or the like) to be retrieved by a scanner function of the OCR apparatus, and converting the pictures into picture image data that can be handled by the system 100, a picture recognizing/correcting client 103, which is configured with an OCR apparatus like the picture reading client 102, for recognizing character information or the like in the image data of a plurality of pictures read by the picture reading client 102, converting the character information or the like into text data that can be handled by the system 100, and storing the text data together with the image data of a plurality of pictures read by the picture reading client 102 in the server 101 (storing unit), a picture confirming client 104 for confirming whether the image data and the text data of a plurality of pictures recognized by the picture recognizing/correcting client 103 and stored in the server 101 are appropriately converted, or whether another image that is not to be retrieved this time gets mixed therewith, and a picture visually retrieving client 105 for visually retrieving image data of a specific picture in the image data of a plurality of pictures stored in the server 101.

The picture displaying apparatus and the picture displaying method according to the first embodiment of this invention are applied to the server 101, the picture confirming client 104 and the picture visually retrieving client 105 of the picture retrieval system 100. Hereinafter, the picture displaying apparatus and the picture displaying method according to the first embodiment of this invention will be described in detail. In this embodiment, a plurality of pictures to be retrieved are, for example, slips that contain characters and are in the same or almost the same form.

The picture reading client 102 and the picture recognizing/correcting client 103 will be described in detail later.

Figure 2:
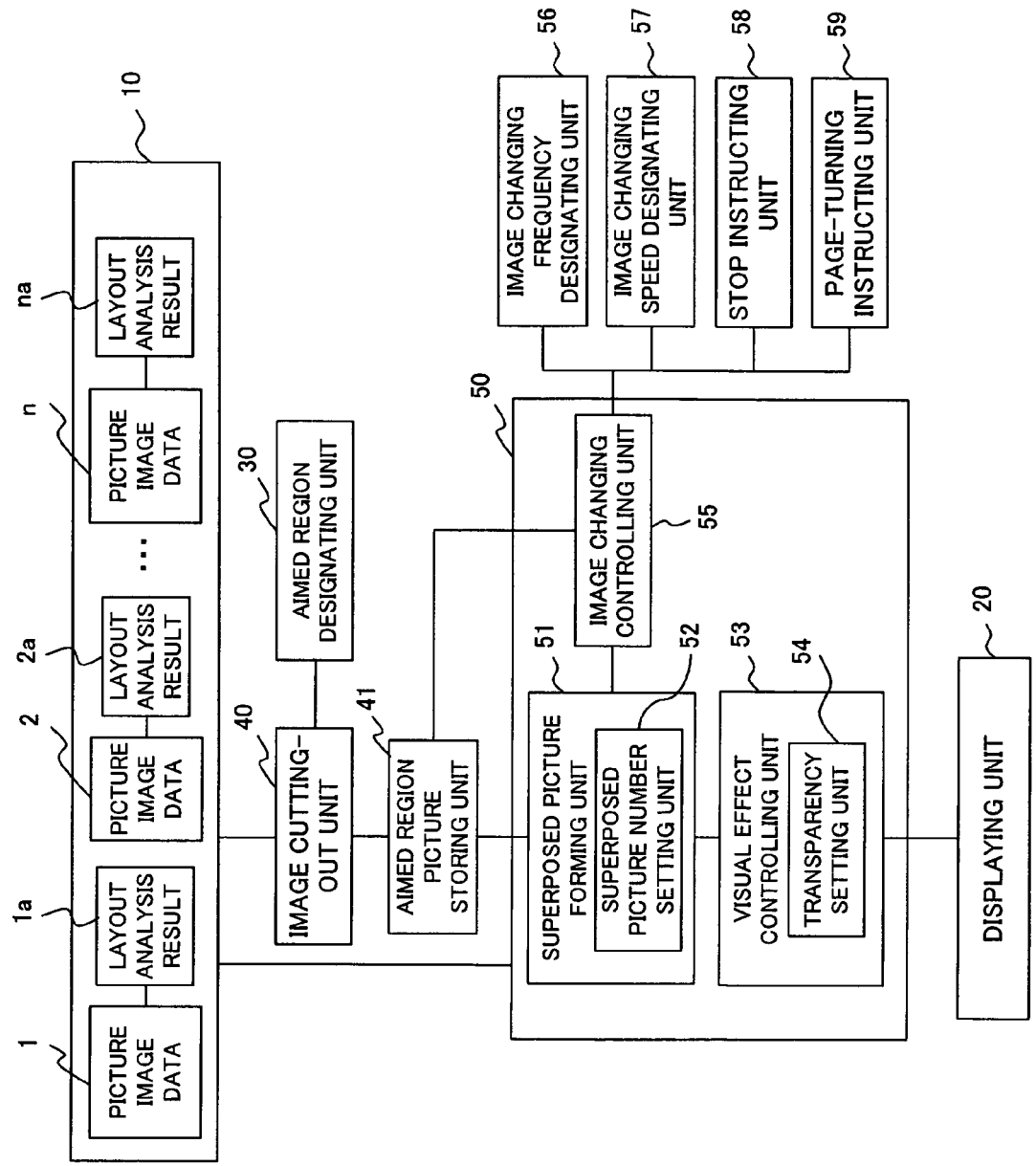
FIG. 2 is a block diagram showing a structure of the picture displaying apparatus according to the first embodiment of this invention.

FIG. 2 is a block diagram showing a functional structure of the picture displaying apparatus according to this embodiment. As shown in FIG. 2, the picture displaying apparatus according to this embodiment comprises a storing unit 10, a displaying unit 20, an aimed region designating unit 30, an image cutting-out unit 40, an aimed region picture storing unit 41, a display controlling unit 50, an image changing frequency designating unit 56, an image changing speed designating unit 57, a stop instructing unit 58, and a page-turning instructing unit 59.

The storing unit 10 stores image data of a plurality of pictures (hereinafter referred simply to as pictures) 1, 2, ..., and n to be retrieved, and layout analysis results 1a, 2a, ..., and na corresponding to the respective pictures 1, 2, ..., and n.

Figure 3:
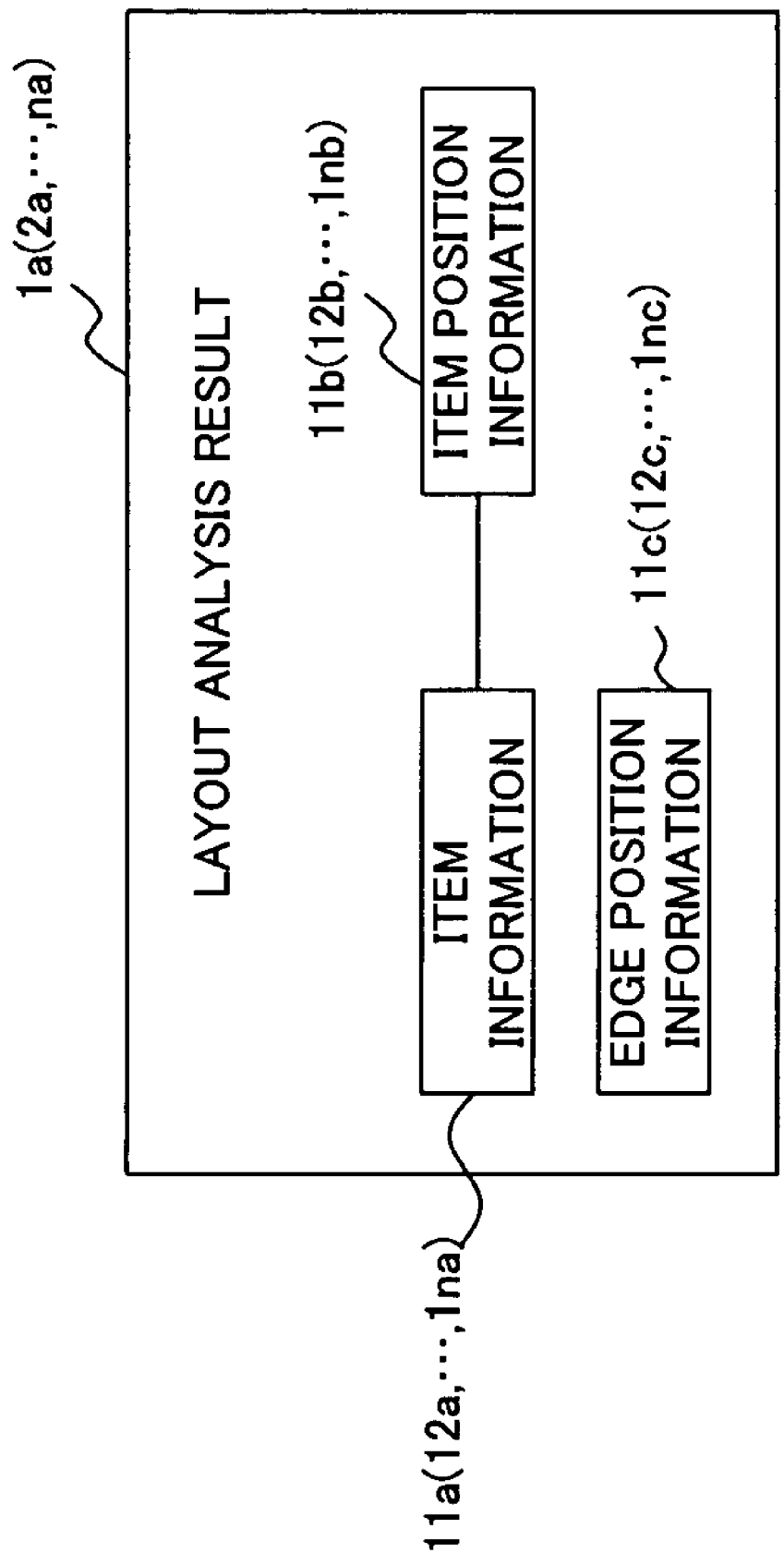
FIG. 3 is a block diagram showing a structure of a layout analysis result in a storing unit of the picture displaying apparatus according to the first embodiment of this invention.

FIG. 3 is a block diagram showing a structure of a layout analysis result 1a in the storing unit 10 of the picture displaying apparatus according to this embodiment. As shown in FIG. 3, the layout analysis result 1a stored in the storing unit 10 correspondingly to the picture 1 contains item information 11a, item position information 11b and edge position information 11c.

The item information 11a is information about one or more (here, plural) items (item names) contained in the picture 1. The item position information 11b is information about coordinates on the picture 1 at which each item of the item information 11a is present, which is related to the relevant item.

The item information 11a and the item position information 11b are obtained by reading the picture 1 by, for example, an OCR apparatus and analyzing the picture 1 in the picture reading client 102 and the picture recognizing/correcting client 103 described above with reference to FIG. 1, which can be obtained by using a known technique disclosed in Japanese Patent No. 3463009 granted to this applicant, for example.

The edge position information 11c is information which defines positions of edges (namely, four corners of the picture) of the picture 1. The edge position information 11c can be obtained by using a known technique disclosed in Japanese Patent Application No. 2002-370596 made by this applicant, for example.

As shown in FIG. 3, each of the layout analysis results 2a, ..., and na is configured in the same way as the layout analysis result 1a.

The pictures 1, 2, ..., and n are read out by the picture reading client 102 described above with reference to FIG. 1. The layout analysis results 1a, 2a, ..., and na are prepared by the picture recognizing/correcting client 103 described above with reference to FIG. 1. The storing unit 10 corresponds to the storing unit included in the server 101 described above with reference to FIG. 1.

The positions of the pictures 1, 2, ..., and n are uniformed on the basis of detected edge positions (edge position information 11c, 12c, ..., and 1nc) by using, for example, the technique disclosed in the above Patent Application No. 2002-370596.

The displaying unit 20 is a display unit or the like, for example, which displays at least one of the plural pictures 1, 2, ..., and n stored in the storing unit 10.

The aimed region designating unit 30 designates a characteristic part (partial region) in a picture to be retrieved in the plural pictures 1, 2, ..., and n as an aimed region in order that the image cutting-out unit 40 to be described later cuts out the aimed region from each of the plural pictures 1, 2, ..., and n.

Designation of the aimed region by the aimed region designating unit 30 is done by using the techniques disclosed in the above Japanese Patent Application No. 2002-370596 and Japanese Patent No. 3463009, details of which will be described later with reference to FIG. 7.

Figure 4:
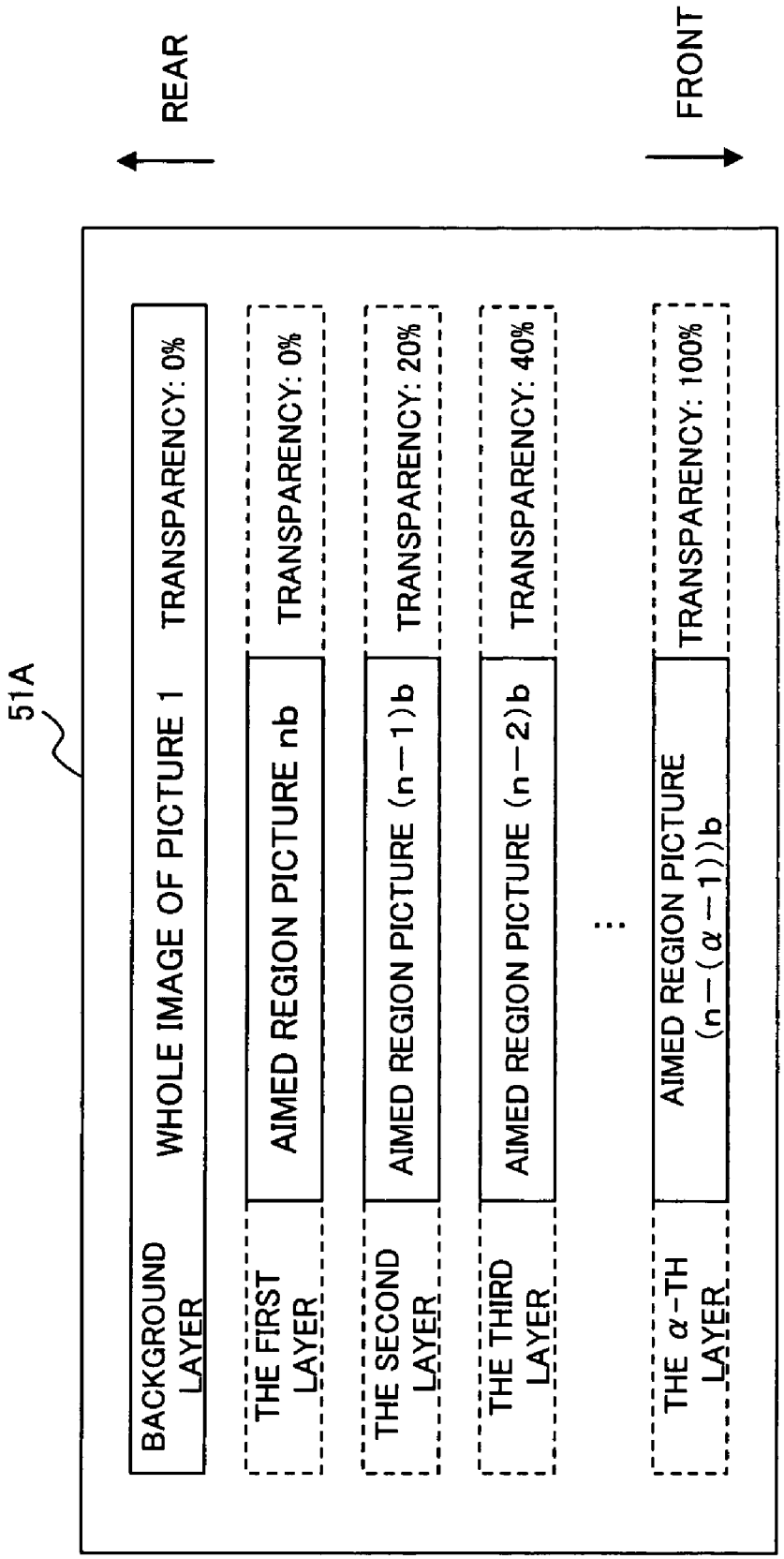
FIG. 4 is a typical diagram showing an example of a superposed picture formed by a superposed picture forming unit of the picture displaying apparatus according to the first embodiment of this invention.

The image cutting-out unit 40 cuts out the aimed regions designated by the aimed region designating unit 30 from the plural pictures 1, 2, ..., and n as aimed region pictures 1b, 2b, ..., and nb (refer to FIG. 4).

Figure 9:
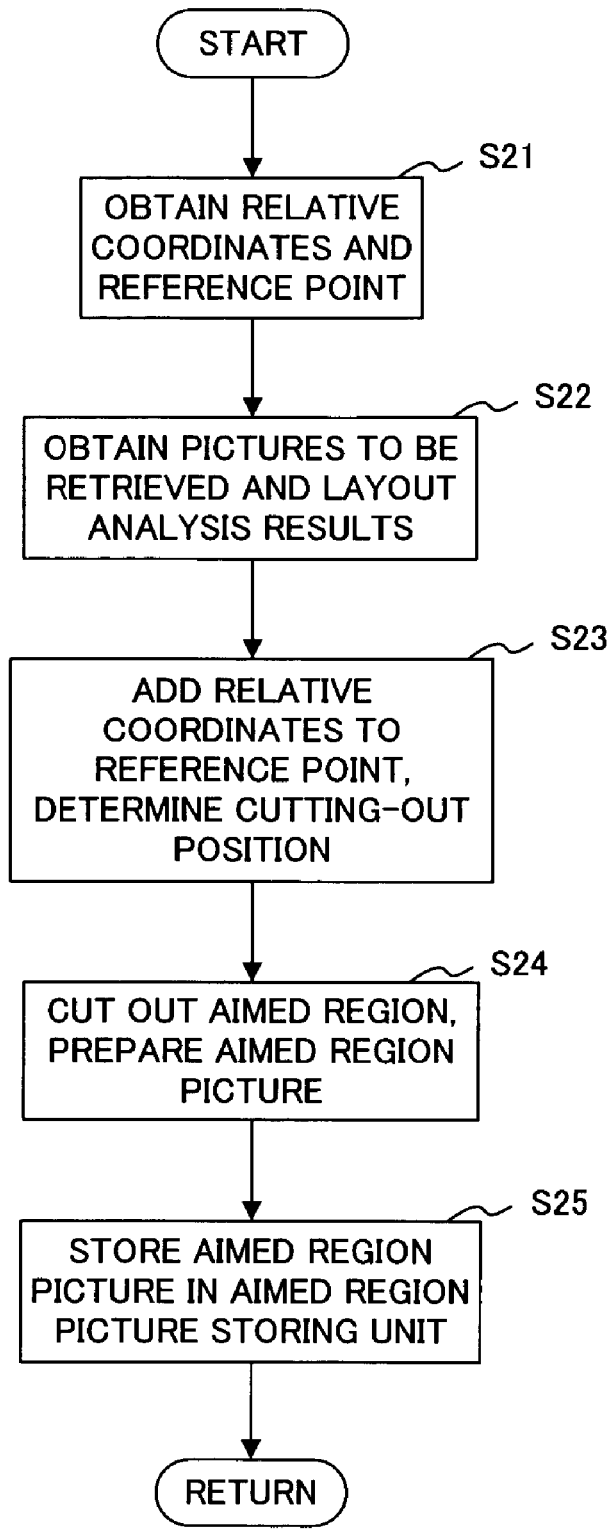
FIG. 9 is a flowchart for illustrating a procedure at an image cutting-out step of the picture displaying method according to the first embodiment of this invention.

Cutting-out of the aimed region pictures by the image cutting-out unit 40 is done by using the techniques disclosed in the above Japanese Patent Application No. 2002-370596 and Japanese Patent No. 3463009, as well, details of which will be described later with reference to FIG. 9.

The aimed region picture storing unit 41 stores the aimed region pictures 1b, 2b, ..., and nb cut out by the image cutting-out unit 40.

The display controlling unit 50 displays the aimed region pictures 1b, 2b, ..., and nb of the plural pictures cutout by the image cutting-out unit 40 and stored in the aimed region picture storing unit 41 on the displaying unit 20. As shown in FIG. 2, the display controlling unit 50 comprises a superposed image forming unit 51, a visual effect controlling unit 53 and an image changing controlling unit 55.

The superposed picture forming unit 51 is controlled by the image changing controlling unit 55 to be described later to superpose a predetermined number of aimed region pictures 1b, 2b, ..., and nb of the plural pictures 1, 2, ..., and n cut out by the image cutting-out unit 40 on one another, thereby to form a superposed picture 51A (refer to FIG. 4). Here, a predetermined number of aimed region pictures 1b, 2b, ..., and nb (hereinafter referred simply to as aimed region pictures when the aimed region pictures 1b, 2b, ..., and nb are not particularly discriminated one from the other) are expanded on different layers, respectively, to form the superposed picture 51A.

FIG. 4 is a typical diagram showing an example of the superposed picture 51A formed by the superposed picture forming unit 51 of the picture displaying apparatus according to this embodiment. As shown in FIG. 4, the superposed picture forming unit 51 expands the aimed region pictures 1b, 2b, ..., and nb in respective layers, from the first layer to the α-th layer (here, α is an integer not less than four), superposes the aimed region pictures 1b, 2b, ..., and nb to form the superposed picture 51A. In the example shown in FIG. 4, the first layer is set rearmost, the α-th layer is set foremost, and the layers from the first layer to the α-th layer are superposed in order.

As shown in FIG. 4, in a layer behind the first layer, the superposed picture forming unit 51 expands a picture 1, 2, ..., or n corresponding to the aimed region picture 1b, 2b, ..., or nb that is first instructed (transmitted) to be displayed by the image changing controlling unit 55 to be described later, or the whole picture (here, the whole picture of the picture 1; picture for designation) of the picture 1, 2, ..., or n beforehand displayed on display unit 20.

As shown in FIG. 2, the superposed picture forming unit 51 comprises a superposed picture setting unit 52 for setting the number of aimed region pictures forming the superposed picture 51A, in other words, setting the number of layers (namely, the value of α) from the first to the α-th layer.

The visual effect controlling unit 53 controls mainly a displaying method (visual effect) when the superposed picture 51A formed by the superposed picture forming unit 51 is displayed on the displaying unit 20. Here, the visual effect controlling unit 53 enlarges the superposed picture 51A and displays it on the displaying unit 20, and displays each of the aimed region pictures 1b, 2b, . . . , and nb forming the superposed picture 51A at a predetermined transparency in the corresponding layer.

As shown in FIG. 4, the visual effect controlling unit 53 comprises a transparency setting unit 54 for setting the transparency in each layer (the first to the $\alpha$-th layer) of the superposed picture 51A.

Namely, the visual effect controlling unit 53 displays each of the aimed region pictures 1b, 2b, . . . , and nb expanded in the corresponding layer (from the first to the $\alpha$-th layer) at a transparency of the layer designated by the transparency setting unit 54. As shown in FIG. 4, the transparency setting unit 54 sets the transparency of each of the layers so that the transparency is step-wisely increased from the first layer to the $\alpha$-th layer.

In the example shown in FIG. 4, the visual effect controlling unit 53 displays the whole picture of the picture 1 in the background layer at a transparency of 0% on the displaying unit 20.

The image changing controlling unit 55 controls formation of the superposed picture 51A by the superposed picture forming unit 51 to change the aimed region pictures 1b, 2b, . . . and nb forming the superposed picture 51A. The image changing controlling unit 55 instructs the superposed picture forming unit 51 to form the superposed picture 51A in order that desired aimed region pictures among the aimed region pictures cut out by the image cutting-out unit 40 and stored in the aimed region picture storing unit 41 are formed as the superposed picture 51A and displayed on the displaying unit 20. According to this embodiment, the aimed region pictures 1b, 2b, . . . , and nb are added to the superposed picture 51A in order.

The image changing controlling unit 55 newly adds an aimed region picture to the superposed picture 51A when changing the superposed picture 51A so that the layers of the aimed region pictures forming the superposed picture 51A are step-wisely changed at this point of time. The oldest aimed region picture among the plural aimed region pictures forming the superposed picture 51A is discarded.

Namely, when the superposed picture 51A is changed, the image changing controlling unit 55 newly adds the aimed region picture nb to the first layer, shifts forward each of the aimed region pictures 1b, 2b, . . . , and (n−1)b forming the superposed picture 51A up to this time to the next layer, and discards the aimed region picture (n−($\alpha$−1))1b displayed at a transparency of 100% in the $\alpha$-th layer, thereby changing the superposed picture 51A, as shown in FIG. 4.

The image changing frequency designating unit 56 sets the number of aimed region pictures to be successively changed by the image changing controlling unit 55 in the superposed picture 51A in order to successively change the aimed region pictures forming the superposed picture 51A under a control of the image changing controlling unit 55. According to this embodiment, the image changing frequency designating unit 56 can set an arbitrary number from 1 to n.

In other words, in the superposed picture 51A shown in FIG. 4, the image changing frequency designating unit 56 sets the number of aimed region pictures to be successively added so that a predetermined number of aimed region pictures are successively added to the first layer at constant time intervals.

The image changing speed designating unit 57 sets a speed at which the aimed region pictures forming the superposed picture 51A are successively changed (successive changing speed) when the superposed picture 51A is successively changed with aimed region pictures in number designated by the image changing frequency designating unit 56.

The stop instructing unit 58 stops changing of the superposed picture 51A by the image changing controlling unit 55, and instructs the image changing controlling unit 55 to display only the picture of a predetermined aimed region picture among the aimed region pictures forming the superposed picture 51A on the display unit 55 at this moment.

Namely, the stop instructing unit 58 stops the state in which the superposed picture 51A shown in FIG. 4 is kept changed by the image changing controlling unit 55 to display the picture of an aimed region picture expanded in a predetermined layer at a transparency of 0% on the displaying unit 20. For example, the stop controlling unit 58 instructs the image changing controlling unit 55 to display only a picture (n−2) of the aimed region picture (n−2)b expanded in the third layer, which is the third new layer in the superposed picture 51A shown in FIG. 4, at a transparency of 0% on the displaying unit 20. When a stop instruction is sent from the stop instructing unit 58, the image changing controlling unit 55 interrupts the changing of the superposed picture 51A, and controls so that only the picture of a predetermined aimed region picture is displayed on the displaying unit 20.

Note that the picture of an aimed region picture expanded in a predetermined layer displayed by the stop instructing unit 58 is not limited to the picture of an aimed region picture expanded in the third layer, but the picture of an aimed region picture expanded in any layer in the superposed picture 51A may be displayed on the displaying unit 20.

The page-turning instructing unit 59 instructs the image changing controlling unit 55 to turn the pages so that a desired picture is displayed in the state in which the changing of the superposed picture 51A by the image changing controlling unit 55 is stopped by the stop instructing unit 58 and the picture of a predetermined aimed region picture is displayed on the displaying unit 20. The retrieval is completed by displaying a picture to be retrieved by the page-turning instructing unit 59.

The stop instructing unit 58 and the page-turning instructing unit 59 together function as a picture specifying instructing unit for specifying a picture to be retrieved.

In the picture displaying apparatus according to the first embodiment, aimed region pictures designated by the aimed region designating unit 30 and cut out by the image cutting-out unit 40 are displayed as a superposed picture 51A on the displaying unit 20 by the superposed picture forming unit 51, the visual effect controlling unit 53 and the image changing controlling unit 55. At this time, an aimed region picture newly added to the superposed picture 51A is kept displayed on the displaying unit 20 at a step-wisely increased transparency until the aimed region picture becomes the oldest among the aimed region pictures forming the superposed picture 51A, thus the aimed region picture is displayed for a predetermined period of time as an afterimage, not erased immediately after displayed on the displaying unit 20.

Figure 5:
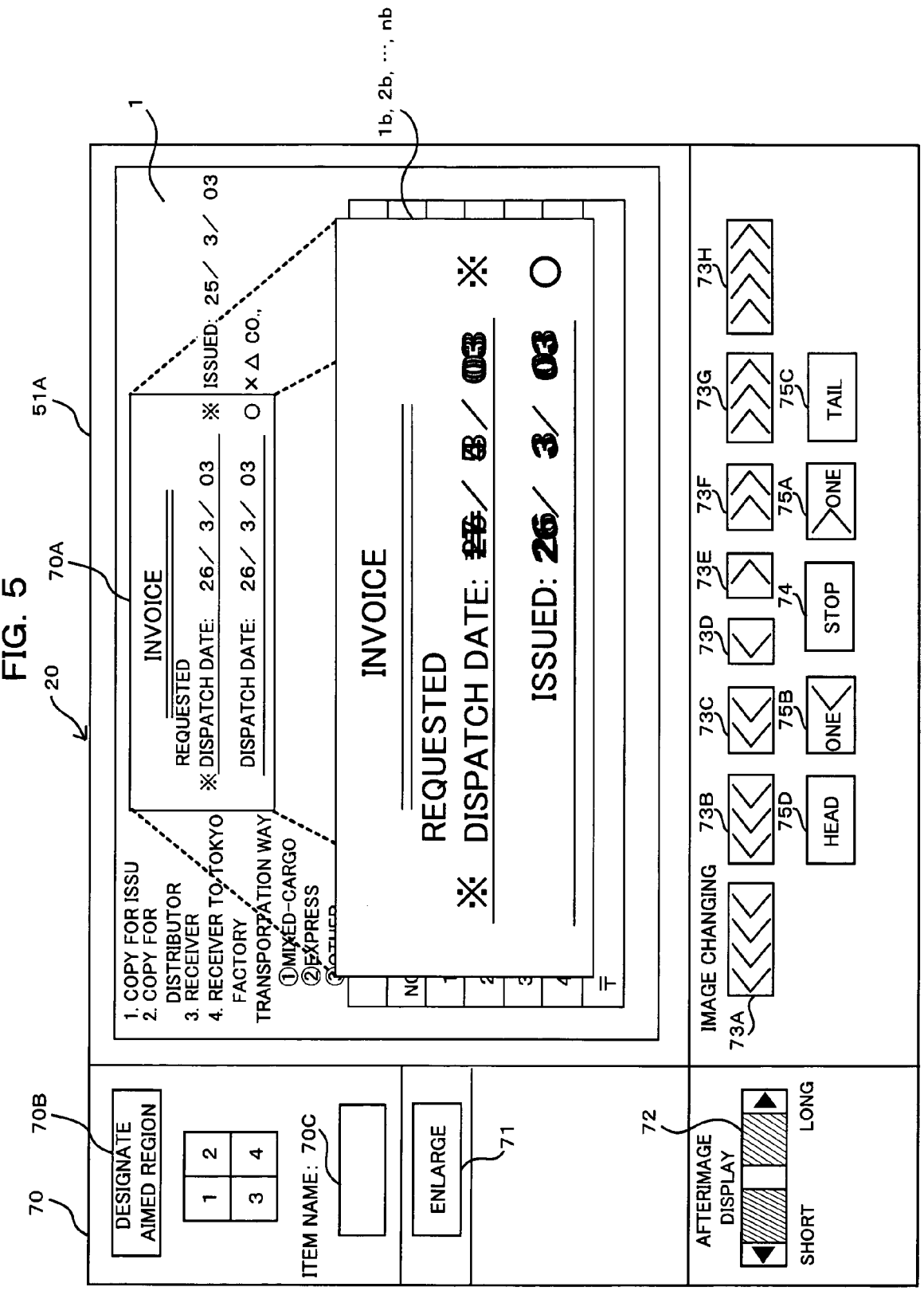
FIG. 5 is a typical diagram showing a screen displayed on a displaying unit in the picture displaying apparatus and the picture displaying method according to the first embodiment of this invention.

Next, description will be made of a screen displayed on the displaying unit 20 of this picture displaying apparatus. FIG. 5 is a typical diagram showing a screen displayed on the displaying unit 20 by the picture displaying apparatus and the picture displaying method according to this embodiment. Here, the description will be made by way of example wherein retrieval is done in a plurality of pictures 1, 2, . . . , and n to be retrieved are slips (for example, invoices) and a picture in which the date in an item of requested dispatch date in the slip is corrected is desired to be retrieved.

As shown in FIG. 5, the superposed picture 51A is displayed on the displaying unit 20. Additionally, there are displayed an aimed region designation operating unit 70 implemented by the aimed region designating unit 30, an enlarged display operating unit 71 implemented by the image changing controlling unit 55, an afterimage display time operating unit 72 implemented by the superposed picture setting unit 52, the image changing controlling unit 55, the image changing frequency designating unit 56 and the image changing speed designating unit 57, page changing operating units (buttons) 73A through 73H implemented by the image changing controlling unit 55 and the image changing frequency designating unit 56, a stop operating unit 74 implemented by the image changing controlling unit 55 and the stop instructing unit 58, and page-turning operating units (buttons) 75A through 75D implemented by the image changing controlling unit 55 and the page-turning instructing unit 59. A partial region 70A including the item of requested dispatch date that is a characteristic part of a picture to be retrieved is designated as the aimed region by operating the aimed region designation operating unit 70 (namely, by the aimed region designating unit 30).

The aimed region designation operating unit 70, the enlarged display operating unit 71, the afterimage display operating unit 72, the page changing operating units 73A through 73H, the stop operating unit 74 and the page-turning operating units 75A through 75D are selectively operated by means of a mouse or a keyboard connected to this picture displaying apparatus to fulfill their functions. Details of these operating units will be described later.

As shown in FIG. 5, in the superposed picture 51A displayed on the displaying unit 20 by this picture displaying apparatus, there are a plurality of enlarged aimed region pictures 1b, 2b, . . . , and nb superposed on one another, each of which is displayed at a predetermined transparency. Even when the pages are turned by using the page-turning operating units 75A through 75D, each of the aimed region pictures 1b, 2b, . . . , and nb are kept to be displayed for a predetermined period of time while its image is gradually faded (the transparency is gradually increased) as an afterimage without being immediately erased.

Figure 6:
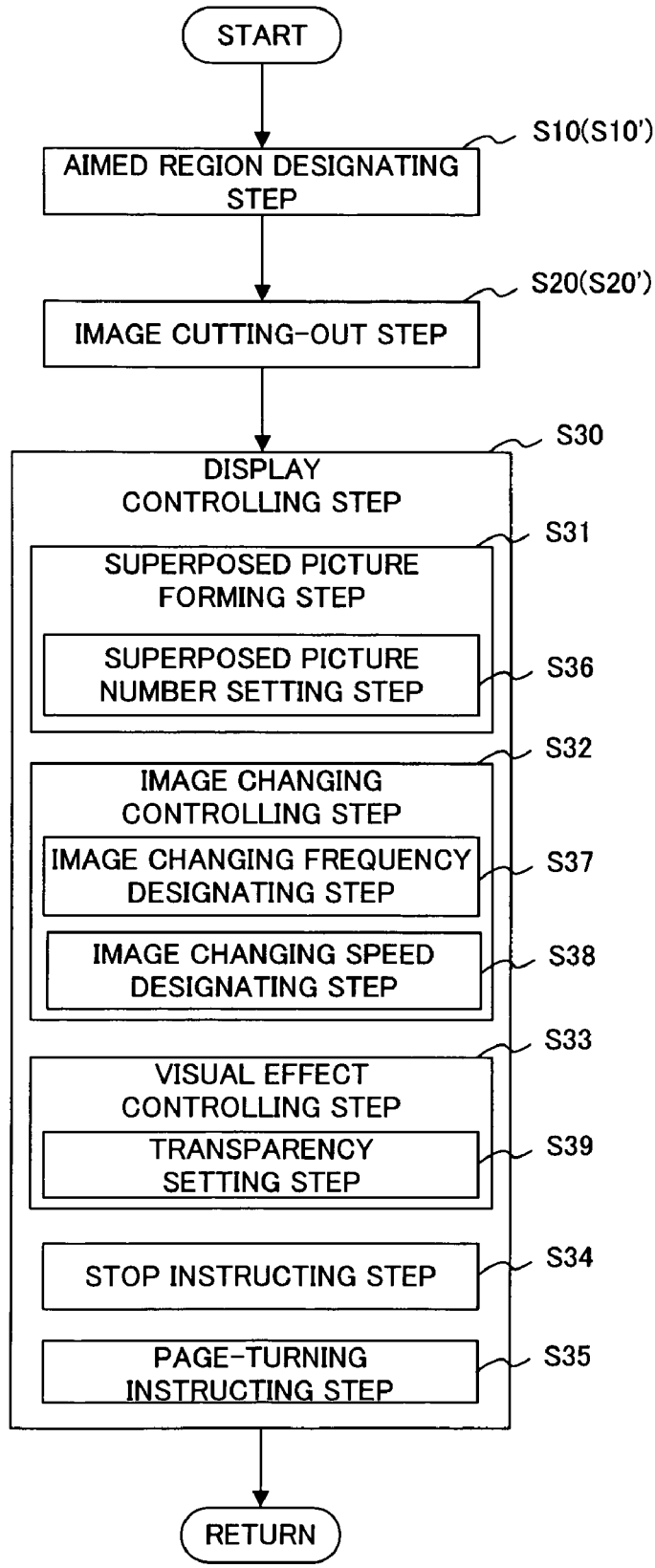
FIG. 6 is a flowchart for illustrating a procedure of the picture displaying method according to the first embodiment of this invention.

Next, description will be made of the picture displaying method according to this embodiment. FIG. 6 is a flowchart for illustrating a procedure of the picture displaying method according to this embodiment. As shown in FIG. 6 (steps S10 through S30), the picture displaying method according to this embodiment comprises the steps of an aimed region designating step S10 at which the user designates, by means of the aimed region designating unit 30, a partial region (here, a region including the item of requested dispatch date), which is characteristic in a picture to be retrieved among pictures 1, 2, . . . , and n stored in the storing unit 10, an image cutting-out step S20 at which the image cutting-out unit 40 cuts out the aimed region designated at the aimed region designating step S10 from each of the pictures 1, 2, . . . , and n as an aimed region picture, and a display controlling step S30 at which the display controlling unit 50 displays the aimed region pictures 1b, 2b, and nb of the pictures 1, 2, . . . , and n cut out at the image cutting-out step S20 on the displaying unit 20.

Figure 7:
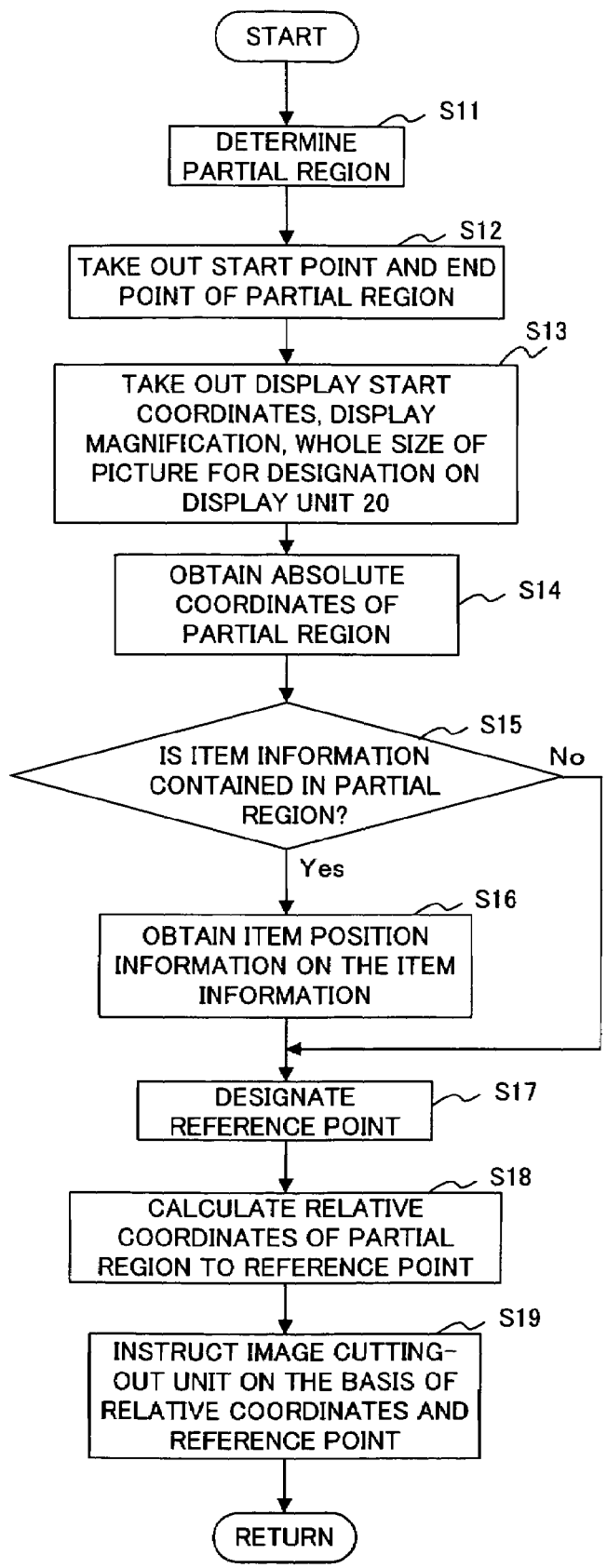
FIG. 7 is a flowchart for illustrating a procedure at an aimed region designating step of the picture displaying method according to the first embodiment of this invention.

FIG. 7 is a flowchart for illustrating a procedure at the aimed region designating step S10 of the picture displaying method according to this embodiment. As shown in FIG. 7 (steps S11 through S19), at the aimed region designating step S10, the user drags a mouse connected to the above picture displaying apparatus to determine a characteristic part of a picture to be retrieved on the displaying unit 20 on which only one picture (here, the picture 1) is displayed as a picture for designation among the pictures 1, 2, . . . , and n stored in the storing unit 10 (step S11). In the example shown in FIG. 5, the user drags the mouse to determine the partial region 70A so that the partial region includes at least the item of desired dispatch date with only the whole of the picture 1 displayed on the displaying unit 20, in order to retrieve a picture in which the item of requested dispatch date is corrected.

Next, the aimed region designating unit 30 takes out a start point and an end point of the partial region (namely, determined by dragging the mouse) (step S12), and extracts display start coordinates, display magnification, whole size (display size) of the picture for designation on the displaying unit 20 (step S13).

The aimed region designating unit 30 obtains absolute coordinates of the partial region on the picture for designation on the basis of the start point and end point of the partial region, the display start coordinates, display magnification and whole size of the picture for designation (picture 1) (step S14).

Next, it is determined whether the item included in the item information 11a of the layout analysis result 1a in the storing unit 10 is present in the partial region or not (step S15). Here, it is determined whether the item of requested dispatch date or the item of dispatch date is included in the item information 11a or not.

When it is determined that the item included in the item information 11a is present within the partial region (Yes route at step S15), position information on this item is obtained from the item position information 11b corresponding to the item information 11a (step S16). When it is determined that this item is not present within the partial region (NO route at step S15), the above step S16 is skipped.

The aimed region designating unit 30 then designates a reference point used by the image cutting-out unit 40 in order to cut out the aimed region at the image cutting-out step S20 to be described later (step S17). The reference point is obtained by the picture reading client 102 and the picture recognizing/correcting client 103 described above with reference to FIG. 1, for example, and is the item position information 11b and the edge position information 11c in the layout analysis result 1a stored in the storing unit 10, correspondingly to the picture 1.

Here (at step S17), either the position information on the item included in the item position information 11b present within or neighboring to this partial region, or the position information on the four corners of the picture 1 included in the edge position information 11c on the picture 1 is designated as the reference point. When the item included in the item information 11a is present within the partial region, the position information on the item can be obtained. When the item included in the item information 11a is not present within the partial region, the position information on an item included in the item information 11a neighboring the partial region can be designated as the reference point. When the item position information 11b does not exist, the position information on any edge among edges included in the edge position information 11c can be designated as the reference point.

Next, the aimed region designating unit 30 calculates a relative position (coordinates) of the partial region to the reference point (step S18). Namely, using the absolute coordinates of the partial region obtained at the above step S14 or the item position information obtained at the above step S16, relative coordinates of the partial region with respect to the reference point designated at the above step S17 are calculated, and the relative coordinates of the partial region are designated as the aimed region.

The aimed region designating unit 30 sends the relative coordinates and the reference point to the image cutting-out unit 40, and instructs the image cutting-out unit 40 to cut out the relative coordinates as the aimed region (step S19).

As another manner, the aimed region designating unit 30 may display an aimed region setting property screen as shown in FIG. 8 on the displaying unit 20 to allow the user to select an arbitrary reference point among a plurality of reference points beforehand prepared on the basis of the setting screen, thereby to carry out the aimed region designating step S10.

The above steps S13 to S19 are executed by selecting an aimed region designating button 70B of the aimed region designation operating unit 70 by means of the mouse on the screen of the displaying unit 20 shown in FIG. 5, after the partial region 70A is designated at step S12, for example.

Next, description will be made of a procedure of the image cutting-out step S20. FIG. 9 is a flowchart for illustrating a procedure of the image cutting-out step S20 of the picture displaying method according to this embodiment. As shown in FIG. 9 (steps S21 to S25), at the image cutting-out step S20, the image cutting-out unit 40 obtains the relative coordinates and the reference point as the aimed region transmitted from the above aimed region designating step S10 (step S21). The image cutting-out unit 40 then obtains the plural pictures 1, 2, . . . , and n and the layout analysis results 1a, 2a, . . . , and na stored in the storing unit 10 (step S22).

The image cutting-out unit 40 adds the relative coordinates to the reference point in each of the pictures 1, 2, . . . , and n to determine each cutting-out position (step S23). The image cutting-out unit 40 cuts out the aimed region from each of the pictures 1, 2, . . . , and n to prepare (cut out) each aimed region picture (step S24), and stores it in the aimed region picture storing unit 41 (step S25).

According to this embodiment, a partial region designated at the aimed region designating step S10 is designated as the aimed region on the basis of the above reference point at the aimed region designating step S10, and each aimed region picture is cut out at the image cutting-out step S20 on the basis of the above reference point. Irrespective of a difference in position among the pictures 1, 2, . . . , and n at the time of reading and an error due to expansion and contraction of paper, each of the cut-out aimed region pictures can be stably cut out, and a difference in position and size among the aimed region pictures can be surely prevented when the aimed region pictures are superposed at a superposed picture forming step S31 to be described later.

As shown in FIG. 6, the display controlling step S30 includes the superposed picture forming step S31 at which the superposed picture forming unit 51 expands the aimed region pictures cut out at the image cutting-out step S20 in different layers, respectively, and superposes a predetermined number of the aimed region pictures to form the superposed picture 51A, an image changing controlling step S32 at which the image changing controlling unit 55 newly adds an aimed region picture to the superposed picture 51A when changing the aimed region pictures forming the superposed picture 51A, step-wisely shifts forward each of the aimed region pictures forming the superposed picture 51A to the next (front) layer at this point of time, discards the oldest aimed region picture among the plural aimed region pictures forming the superposed picture 51A to change the aimed region pictures forming the superposed picture 51A, and a visual effect controlling step S33 at which the visual effect controlling unit 53 step-wisely sets the transparency of the layers of each of the aimed region pictures forming the superposed picture 51A, enlarges the superposed picture 51A, and displays it on the displaying unit 20.

The display controlling step S30 further includes a stop instructing step S34 at which the stop instructing unit 58 stops changing of the superposed picture 51A at the image changing controlling step S32, and instructs to display the picture of a predetermined aimed region picture on the displaying unit 20, and a page-turning instructing step S35 at which, after the stop instructing step S34, the page-turning instructing unit 59 instructs to turn the pages until the picture displayed on the displaying unit 20 becomes a desired picture.

The superposed picture forming step S31 includes a superposed picture number setting step S36 at which the superposed picture setting unit 52 sets the number of aimed region pictures (the number of layers) forming the superposed picture 51A.

The image changing controlling step S32 includes an image changing frequency setting step S37 at which the image changing frequency designating unit 56 sets the number of aimed region pictures to be successively changed in the superposed picture 51A, and an image changing speed setting step S38 at which the image changing speed designating unit 57 sets a speed at which the aimed region pictures are successively changed in the superposed picture 51A.

The visual effect controlling step S33 includes a transparency setting step S39 at which the transparency setting unit 54 sets the transparency in each of the layers forming the superposed picture 51A.

Enlarging the superposed picture 51A and displaying the same at the visual effect controlling step S33 are executed by selecting the enlargement operating unit 71 by means of the mouse on the screen of the displaying unit 20 shown in FIG. 5.

Setting of the number of aimed region pictures forming the superposed picture 51A at the superposed picture number setting step S36 or setting of the successive changing speed for the aimed region pictures forming the superposed picture 51A at the image changing speed setting step S38 is implemented by selectively operating the afterimage display operation unit 72 by means of the mouse on the screen of the displaying unit 20 shown in FIG. 5, for example.

When the afterimage display operating unit 72 is operated to be moved toward "short," the number of layers forming the superposed picture 51A is decreased by the superposed picture number setting unit 52 at the superposed picture setting step S36, or the speed designated by the image changing speed designating unit 57 at which the superposed picture 51A is changed by the image changing controlling unit 55 is increased. Conversely, when the afterimage display operating unit 72 is operated to be moved toward "long," the number of the layers is increased at the superposed picture number setting step S36, or the speed is decreased at the image changing speed designating step S38.

Setting of the number of aimed region pictures in the superposed picture 51A to be successively changed at the image changing frequency setting step S37 is implemented by selecting any one of the image changing operating units 73A through 73H by means of the mouse on the screen of the displaying unit 20 shown in FIG. 5, for example.

Each of the buttons 73A through 73H is set to a different number of aimed region pictures to be successively changed by the image changing frequency designating unit 56. For example, when the button 73A is selected, four aimed region pictures are successively turned backward in the superposed picture 51A. When the button 73G is selected, three new aimed region pictures are added to the superposed picture 51A.

According to this picture displaying method, when the user finds out a specific picture to be retrieved (that is, a picture in which the item of requested dispatch date is corrected) while the superposed picture 51A is changed with an afterimage of each aimed region picture remaining on the displaying unit 20 as above at the superposed picture forming step S31, the image changing controlling step S32 and the visual effect controlling step S33, the user selects the stop operating unit 74 by means of the mouse, whereby the stop instructing step S34 is executed to stop the changing of the superposed picture 51A and display the predetermined picture, in order to certainly specify the picture to be retrieved.

When the picture displayed at the stop instructing step S34 is not the picture to be retrieved, the user selects any one of the page turning operating unit 75A through 75D by means of the mouse, in order to display the picture to be retrieved at the page turning instructing step S35. Whereby, the picture to be retrieved is certainly retrieved, and the retrieval is completed.

The stop instructing step S34 and the page-turning instructing step S35 together function as a picture specifying instructing step of specifying a picture to be retrieved.

Here, when the page-turning operating unit 75A is operated, a picture next to the above predetermined picture displayed at present is displayed. When the page-turning operating unit 75B is operated, a picture preceding the above predetermined picture displayed at present is displayed. When the page-turning operating unit 75C is operated, the last picture (here, picture n) among pictures stored in the storing unit 10 is displayed. When the page-turning operating unit 75D is operated, the first picture (here, the picture 1) among pictures stored in the storing unit 10 is displayed.

According to the picture displaying apparatus and the picture displaying method of the first embodiment of this invention, when a specific picture is visually retrieved in a plurality of pictures 1, 2, . . . , and n stored in the storing unit 10, the aimed region designating unit 30 designates a characteristic partial region in a specific picture to be retrieved as an aimed region picture, and the image cutting unit 40 cuts out the aimed region pictures 1b, 2b, . . . , and nb from the respective pictures. The superposed picture forming unit 51 expands a predetermined number of aimed region pictures in different layers, respectively, among the cut-out aimed region pictures to form the superposed picture 1A by superposing the aimed region pictures on one another. The visual effect controlling unit 53 displays each of the aimed region pictures in a corresponding layer at a predetermined transparency in the superposed picture 51A on the displaying unit 20. Accordingly, it is possible to visually retrieve a target picture in a large amount of pictures 1, 2, . . . , and n in the same or almost the same form, and possible to do retrieval at a time in the plural pictures 1, 2, . . . , and n. This improves the efficiency of retrieval.

The user needs to look at only the superposed picture 51A formed by superposing characteristic portions (aimed regions) of pictures to be retrieved, which improves the visibility and facility for the user.

When the image changing controlling unit 55 changes the aimed region pictures forming the superposed picture 51A, a new aimed region picture is added, whereas the oldest aimed region picture among the aimed region pictures forming the superposed picture is discarded at this point of time, whereby the superposed picture 51A is changed. The image changing frequency designating unit 56 can successively add aimed region pictures to the superposed picture 51A, which can further improve the retrieval efficiency.

Since only the aimed region pictures are cut out and displayed, it becomes possible to decrease the amount of handled data as compared with a case where the whole pictures are handled. The superposed picture 51A can be displayed (changed) at high speed by setting the successive changing speed by the image changing speed designating unit 57 so that the superposed picture 51A can be clearly displayed without degrading the resolution of the picture or thinning out the picture, that is, without degrading the picture quality of the displayed picture (superposed picture).

When changing the aimed region pictures forming the superposed picture 51A, the image changing controlling unit 55 step-wisely changes the layer of each of the aimed region pictures forming the superposed picture at this point of time. Additionally, the visual effect controlling unit 53 step-wisely sets the transparency of each of the layers in the superposed picture 51A, as well. Accordingly, the aimed region pictures forming the superposed picture 51A do not immediately disappear and cannot be seen even when a new aimed region picture is added after the aimed region pictures are added to the superposed picture 51A, and the after images of the aimed region pictures are displayed for a predetermined period of time with the transparency of each of the aimed region pictures being step-wisely increased. Accordingly, visual retrieval becomes easy, a phenomenon such as drop frame or the like does not occur even when the screen is changed at high speed, and a target to be retrieved can be found out in certain.

The visual effect controlling unit 53 enlarges only the superposed picture 51A and displays it on the displaying unit 20, which improves the visibility.

The superposed picture setting unit 52 changes the number of aimed region pictures forming the superposed picture 51A, and the image changing frequency designating unit 56 and the image changing speed designating unit 57 change the successive changing speed at which the aimed region pictures forming the superposed picture 51A are changed, so that the afterimage effect of the aimed region pictures can be changed according to the number of the plural pictures 1, 2, . . . , and n in which retrieval is done or the degree of difficulty in retrieval, etc., which further improves the retrieval efficiency.

The stop instructing unit 58 stops (suspends) changing of the superposed picture 51A to display the whole of a predetermined picture on the displaying unit, and the page-turning instructing unit 59 can display a picture to be retrieved. Accordingly, it is possible to certainly retrieve a picture to be retrieved and specify the same.

Since designation of an aimed region by the aimed region designating unit 30 and cutting-out of an aimed region picture by the image cutting-out unit 40 are carried out on the basis of the item position information 11b (12b, . . . , or 1nb) and the edge position information 11c (12c, . . . , or 1nc) obtained at the time of reading of each of pictures 1, 2, . . . , and n, the positions of the aimed region pictures forming the superposed picture 51A are uniformed and superposed without deviating from one another. This can improve the visibility and stably provide the above effects. Since a common part of the pictures such as a ruled line or the like of a slip is exactly superposed on one another, for example, there is no danger that a ruled line of an aimed region picture is overlapped with a ruled line of the other and causes a difficult when the user looks at it. Thus, the visibility is excellent.

In this embodiment, it is alternatively possible that, after changing of the superposed picture 51A by the image changing controlling unit 55 is stopped by the stop instructing unit 58 (stop instructing step S34) functioning as a picture specifying instructing unit (picture specifying instructing step), the stop instructing unit 58 (stop instructing step S34) may display only a predetermined aimed region picture, not the whole picture including a predetermined aimed region picture, on the displaying unit 20, and the page-turning instructing unit 59 (page-turning instructing step S35) may display a desired aimed region picture.

[2] Second Embodiment

Next, description will be made of a picture displaying apparatus and a picture displaying method according to a second embodiment of this invention. The picture displaying apparatus according to this embodiment is similar in structure to the picture displaying apparatus shown in FIG. 2 according to the first embodiment, but differs from the first embodiment in the aimed region designating manner by the aimed region designating unit 30 and the aimed region picture cutting-out manner by the image cutting-out unit 40.

Here is thus omitted the description of the same structural parts as the first embodiment, but the description of a characteristic structural part of this embodiment will be now described with reference to the above-described FIGS. 2 through 6. Wherein, like reference characters designate like or corresponding parts, detailed descriptions of which are omitted in this embodiment.

In the picture displaying method according to this embodiment, a characteristic part (partial region) of a picture to be retrieved is included in the item information 11a, 12a, . . . , and 1na stored in the storing unit 10. The picture displaying method according to this embodiment is applied when the item itself is designated as the aimed region.

As shown in FIG. 6, the picture displaying method according to this embodiment includes an aimed region designating step S10' of designating an aimed region by the aimed region designating unit 30, in place of the aimed region designating step S10 in the picture displaying method according to the first embodiment, an image cutting-out step S20' of cutting out an aimed region designated at the aimed region designating step S10' by the image cutting-out unit 40 as an aimed region picture, in place of the image cutting-out step S20 in the picture displaying method according to the first embodiment, and a display controlling step S30 of displaying the aimed region picture cut out at the image cutting-out step S20' on the displaying unit 20 by the display controlling unit 50.

Figure 10:
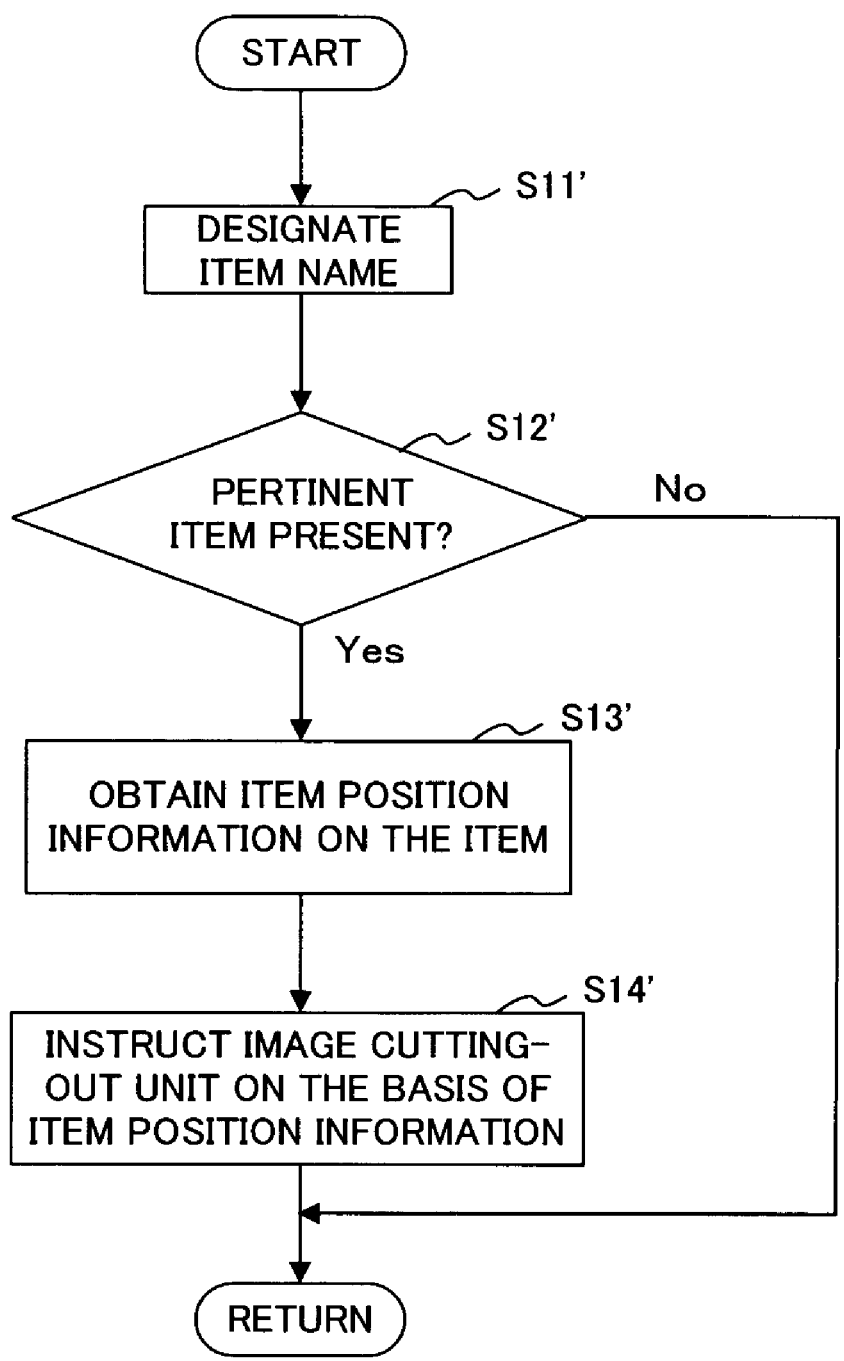
FIG. 10 is a flowchart for illustrating a procedure at an aimed region designating step of a picture displaying method according to a second embodiment of this invention.

FIG. 10 is a flowchart for illustrating a procedure of the aimed region designating step S10' in the picture displaying method according to this embodiment. As shown in FIG. 10 (steps S11' to S14'), at the aimed region designating step S10' in this embodiment, an item name of an item that is a characteristic part of a picture to be retrieved is designated (step S11'). For example, on the displaying unit 20 on which the whole picture 1 shown in FIG. 5 is displayed, the item (requested dispatch date) is inputted in an item name input column 70C of the aimed region designation operating unit 70 implemented by the aimed region designating unit 30 by means of a keyboard connected to this picture displaying apparatus to designate the item (requested dispatch date) as the partial region.

Next, it is determined whether the item is included in the item information 11a or not (step S12'). When it is determined that the item is not included in the item information 11a (No route at step S12'), this process is terminated.

When it is determined that the item is included in the item information 11a (Yes route at step S12'), item position information on the item (coordinates of the item) is obtained from the item position information 11b (step S13').

The aimed region designating unit 30 sends the obtained item position information (coordinates of the item) to the image cutting-out unit 40, and instructs the image cutting-out unit 40 to cut out the coordinates of the item as the aimed region (step S14').

The above steps S12' to S14' are executed by inputting an item name in the item name input column 70C at step S11' on the screen of the displaying unit 20 shown in FIG. 5, and selecting the aimed region designating button 70B of the aimed region designation operating unit 70 by means of a mouse, for example.

Figure 11:
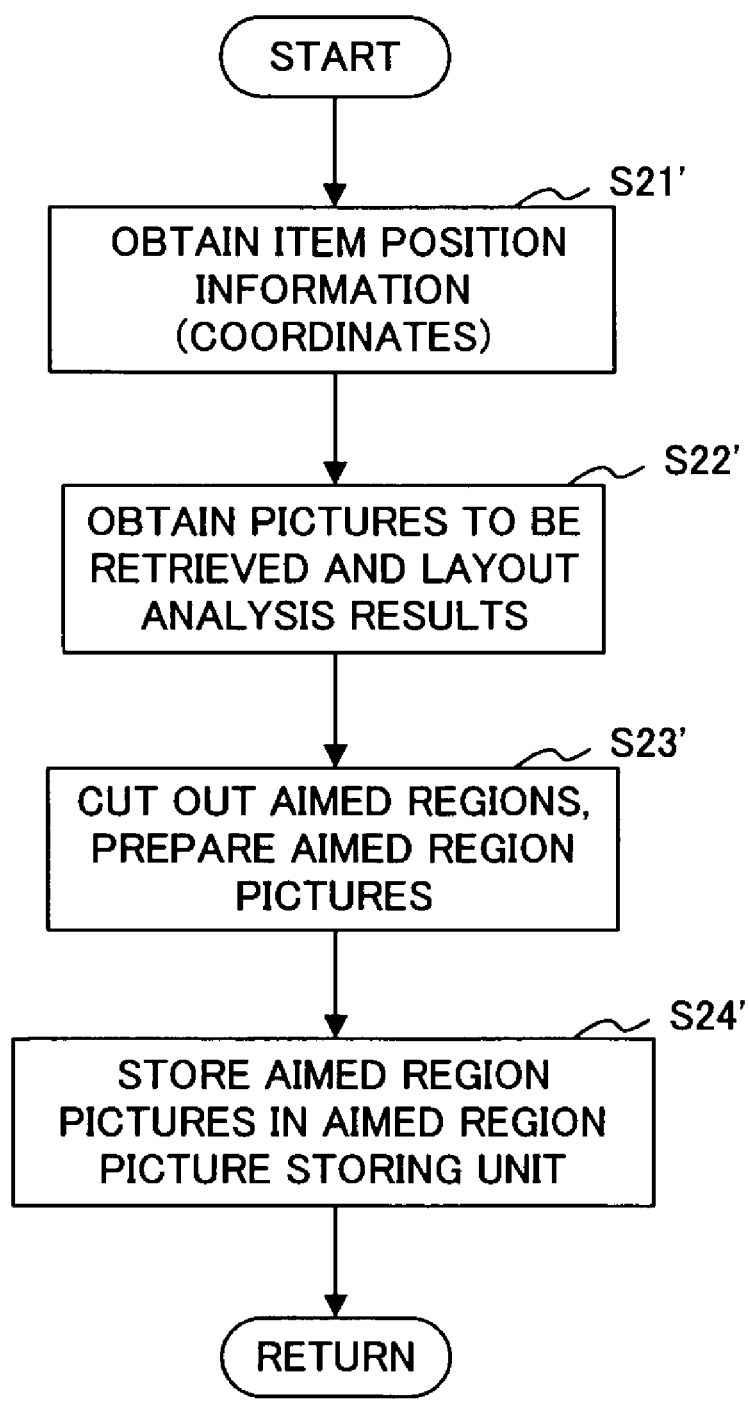
FIG. 11 is a flowchart for illustrating a procedure at an image cutting-out step of the picture displaying method according to the second embodiment of this invention.

Next, description will be made of a procedure of the image cutting-out step S20'. FIG. 11 is a flowchart for illustrating the procedure of the image cutting-out step S20' of the picture displaying method according to this embodiment. As shown in FIG. 11 (steps S21' to S24'), at the image cutting-out step S20', when the image cutting-out unit 40 obtains the coordinates of the item as the aimed region transmitted from the above aimed region designating step S10' (step S21'), the image cutting-out unit 40 obtains a plurality of pictures 1, 2, . . . , and n and layout analysis results 1a, 2a, . . . , and na stored in the storing unit 10 (step S22').

The image cutting-out unit 40 cuts out the aimed region from each of the pictures 1, 2, . . . , and n on the basis of the coordinates of the item, prepares (cuts out) aimed region pictures (step S23'), and stores them in the aimed region picture storing unit 41 (step S24').

According to the picture displaying apparatus and the picture displaying method according to the second embodiment of this invention, a partial region corresponding to item information on a picture to be retrieved is directly designated as the aimed region. Thus, the second embodiment can provide the same effect as the above first embodiment.

[3] Third Embodiment

Figure 12:
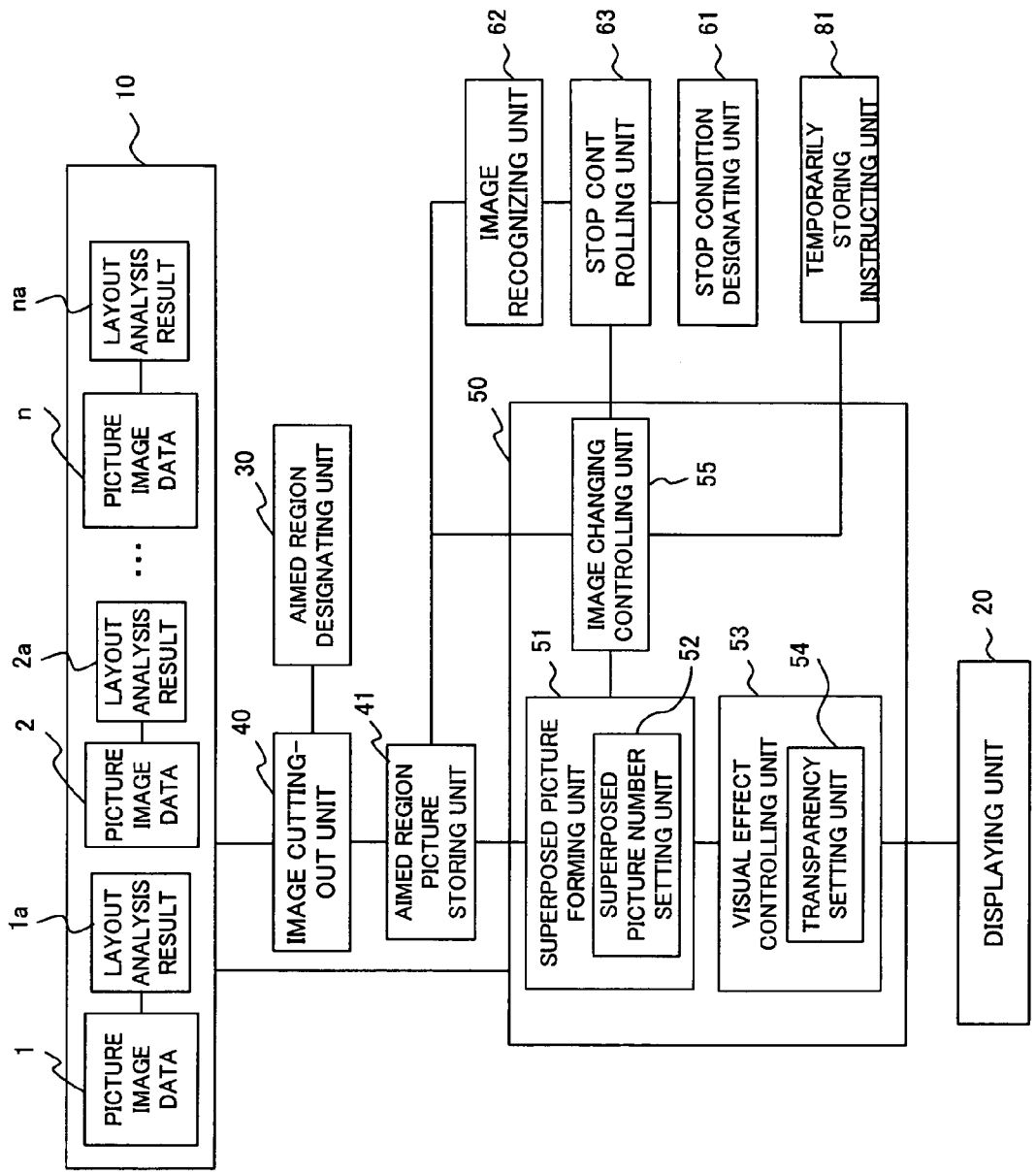
FIG. 12 is a block diagram showing a structure of a picture displaying apparatus according to a third embodiment of this invention.

Next, description will be made of a picture displaying apparatus and a picture displaying method according to a third embodiment of this invention. FIG. 12 is a block diagram showing a structure of the picture displaying apparatus according to this embodiment. As shown in FIG. 12, the picture displaying apparatus according to this embodiment is configured by adding a stop condition designating unit 61, an image recognizing unit 62, a stop controlling unit 63 and a temporarily storing instructing unit 81 to the picture displaying apparatus according to the first embodiment shown in FIG. 2. The remaining parts are similar to those of the apparatus according to the first embodiment. Like reference characters in FIG. 12 designate like or corresponding parts, detailed descriptions of which are thus omitted. The image changing frequency designating unit 56, the image changing speed designating unit 57, illustration of the stop instructing unit 58 and the page-turning instructing unit 59 are omitted in the picture displaying apparatus in FIG. 12, for the sake of simplification.

The stop condition designating unit 61 designates information (character information) included in an item in the aimed region in the superposed picture 51A (refer to FIG. 13) as a stop condition.

The image recognizing unit 62 obtains character information included in each aimed region picture by using a technique described in the above Japanese Patent No. 3463009, for example, and determines whether the condition designated by the stop condition designating unit 61 coincides with the character information or not.

When the image recognizing unit 62 determines that the condition designated by the stop condition designating unit 61 coincides with the character information, the stop controlling unit 63 makes the image changing controlling unit 55 stop changing of the superposed picture 51A at the time that the so-determined aimed region picture is displayed on the superposed picture 51A, and instructs the image changing controlling unit 55 to display the picture of that aimed region picture on the displaying unit 20.

The temporarily storing instructing unit 81 stores the picture displayed on the displaying unit 20 by the image changing controlling unit 55 according to the instruction from the stop controlling unit 63 into an exclusive storing unit, or sets a flag to an aimed region picture of the picture in the aimed region picture storing unit 41, thereby being able to again display it later.

Figure 13:
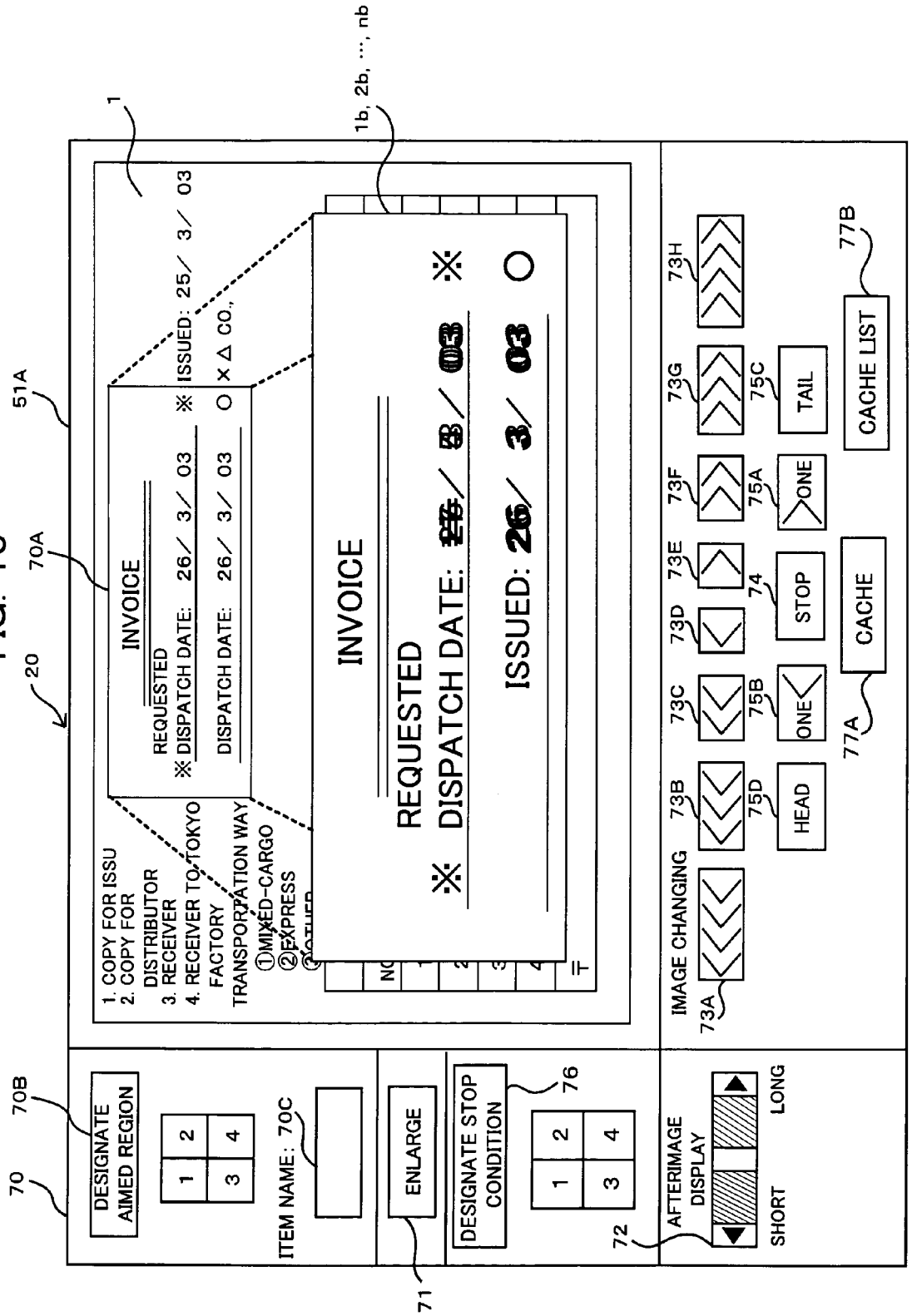
FIG. 13 is a typical diagram showing a screen displayed on a displaying unit in the picture displaying apparatus and a picture displaying method according to a third embodiment of this invention.

Now, description will be made of a screen displayed on the displaying unit 20 by this picture displaying apparatus. FIG. 13 is a typical diagram showing a screen displayed on the displaying unit 20 in the picture displaying apparatus or according to the picture displaying method of this embodiment. In FIG. 13, like reference characters designate like or corresponding parts, detailed description of which are thus omitted.

As shown in FIG. 13, on the displaying unit 20 displayed are, along with the units displayed on the displaying unit 20 shown in FIG. 5, a stop condition designation operating unit 76 implemented by the stop condition designating unit 61 to carry out the stop condition, a cache operating unit 77A implemented by the temporarily storing instructing unit 81 to temporarily store a picture displayed on the displaying unit 20 in order to again display it later, and a cache list operating unit 77B displaying the stored pictures on the displaying unit 20 by operating the cache operating unit 77A. By operating the stop condition designation operating unit 76, a stop controlling step S40 to be described later is executed. By operating the cache operating unit 77A, a temporarily storing step S50 to be described later is executed. By operating the cache list operating unit 77B, a list displaying step S51 is executed.

Figure 14:
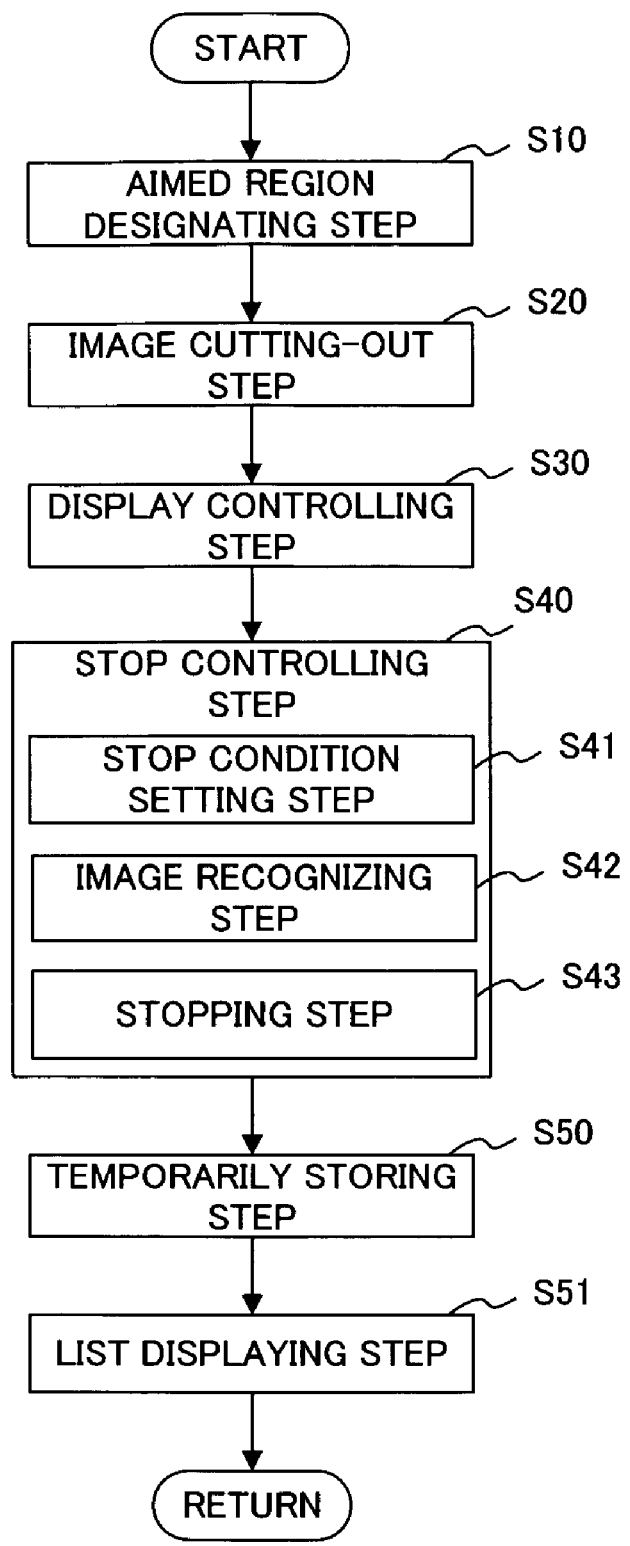
FIG. 14 is a flowchart for illustrating a procedure of the picture displaying method according to the third embodiment of this invention.

Next, description will be made of the picture displaying method according to this embodiment. FIG. 14 is a flowchart for illustrating a procedure of the picture displaying method according to this embodiment. As shown in FIG. 14 (steps S10 to S51), the picture displaying method of this embodiment is configured by adding the stop controlling step S40, the temporarily storing step S50 and the list displaying step S51 to the picture displaying method according to the first embodiment shown in FIG. 6. In FIG. 14, like reference characters designate like or corresponding parts, detailed descriptions of which are thus omitted. The displaying controlling step S30 is simplified and shown, for the sake of simplification.

As shown in FIG. 14, the picture displaying method according to this embodiment includes the stop controlling step S40 of stopping changing of the superposed picture 51A at the display controlling step S30 when an aimed region picture satisfying a predetermined stop condition is detected, and displaying a picture of that aimed region picture on the displaying unit 20, the temporarily storing step S50 of temporarily storing the picture displayed at the stop controlling step S40 by the temporarily storing instructing unit 81, and the list displaying step S51 of displaying a list of pictures temporarily stored at the temporarily storing step S50 by the temporarily storing instructing unit 81 on the displaying unit 20, together with the aimed region designating step S10, the image cutting-out step S20 and the display controlling step S30.

The stop controlling step S40 includes a stop condition setting step S41, an image recognizing step S42 and a stopping step S43.

At the stop controlling step S40, the stop condition setting unit 61 designates predetermined character information included in a characteristic part (item) of a picture to be retrieved as the stop condition at the stop condition setting step S41 in order to retrieve a picture that is a target in retrieval. At this time, a stop condition setting property screen as shown in FIG. 15 may be displayed on the displaying unit 20 by the stop condition setting unit 61 to allow the user to select the stop condition on the basis of this setting screen, for example, whereby the stop condition setting step S41 is carried out.

At image recognizing step S42, the image recognizing unit 62 determines whether the character information on each of aimed region pictures meets the stop condition set at the stop condition setting step S41, and the stop condition is satisfied or not.

Figure 16:
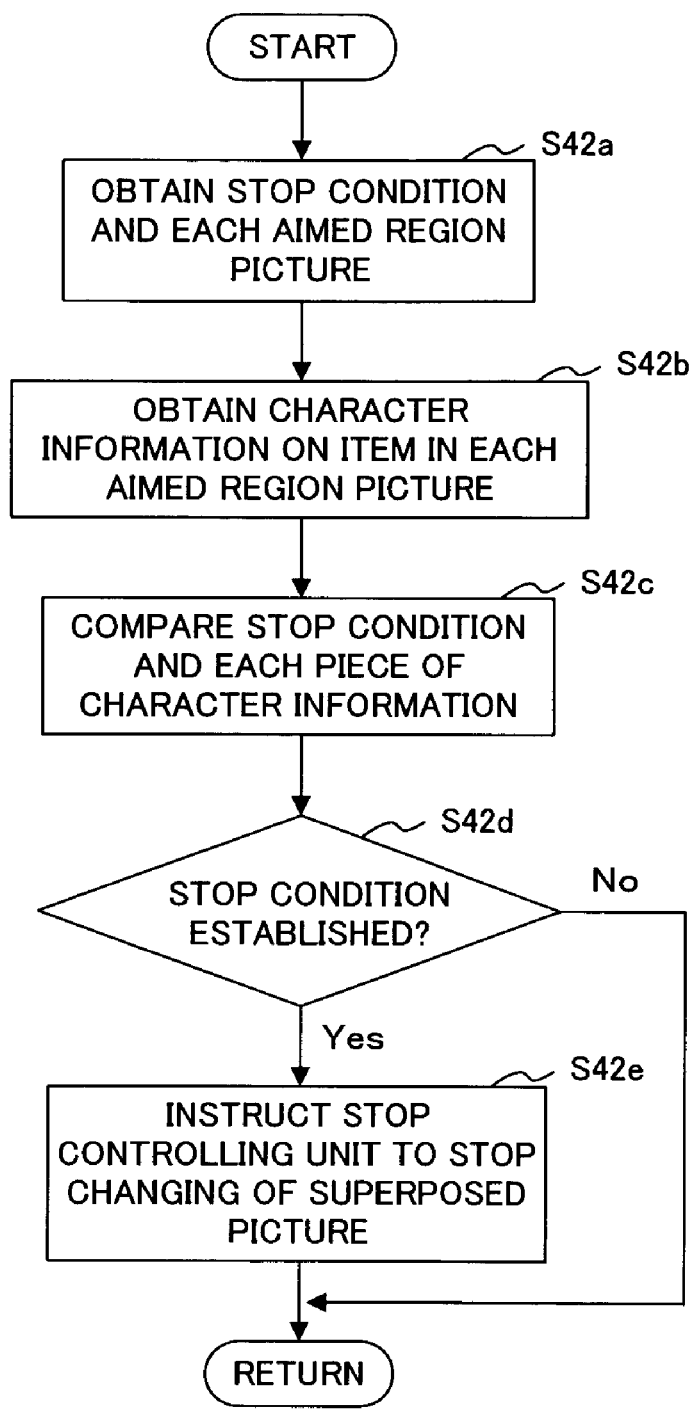
FIG. 16 is a flowchart for illustrating a procedure of an image recognizing step of the picture displaying method according to the third embodiment of this invention.

FIG. 16 is a flowchart for illustrating a procedure at the image recognizing step S42 in the picture displaying method according to this embodiment. As shown in FIG. 16 (steps S42a to S42e) at the image recognizing step S42, the image recognizing unit 62 obtains the stop condition set at the stop condition setting step S41 and each aimed region picture (step S42a).

The image recognizing unit 62 obtains character information on a predetermined item in each of the aimed region pictures, using the technique as described in the above Japanese Patent No. 3463009, for example (step S42b), and compares the obtained character information in each of the aimed region pictures with the stop condition (step S42c).

When the stop condition coincides with the character information, that is, when the stop condition is satisfied (Yes route at step S42d), the image recognizing unit 62 instructs the stop controlling unit 63 to stop changing of the superposed picture 51A by the image changing controlling unit 55 at the point of time that the aimed region picture meeting the stop condition is displayed on the superposed picture 51A (step S42e).

When the stop condition is not satisfied (No route at step S42d), the process at the image recognizing step S42 is terminated.

When the stop condition is satisfied at the image recognizing step S42, the stop controlling unit 63 stops changing of the superposed picture 51A by the image changing controlling unit 55 at the stopping step S43, and displays a picture of the aimed region picture satisfying the stop condition on the displaying unit 20.

According to the third embodiment of this invention, the picture displaying apparatus and the picture displaying method can provide the same effects as the above first embodiment. A characteristic part (character information or the like) in a picture to be retrieved is set as the stop condition, changing of the superposed picture 51A is stopped when an aimed region picture meeting the stop condition is detected, and a picture of the aimed region picture is displayed on the displaying unit 20. Accordingly, automatic retrieval becomes possible by setting the stop condition, which further improves the retrieval efficiency.

As a modification of this embodiment, the above character information may be retained in the layout analysis results 1a, 2a, ..., and na of the storing unit 10, and the image recognizing unit 62 (the image recognizing step S42) may obtain the character information on each of aimed region pictures from the layout analysis results 1a, 2a, ..., and na.

[4] Fourth Embodiment

Figure 17:
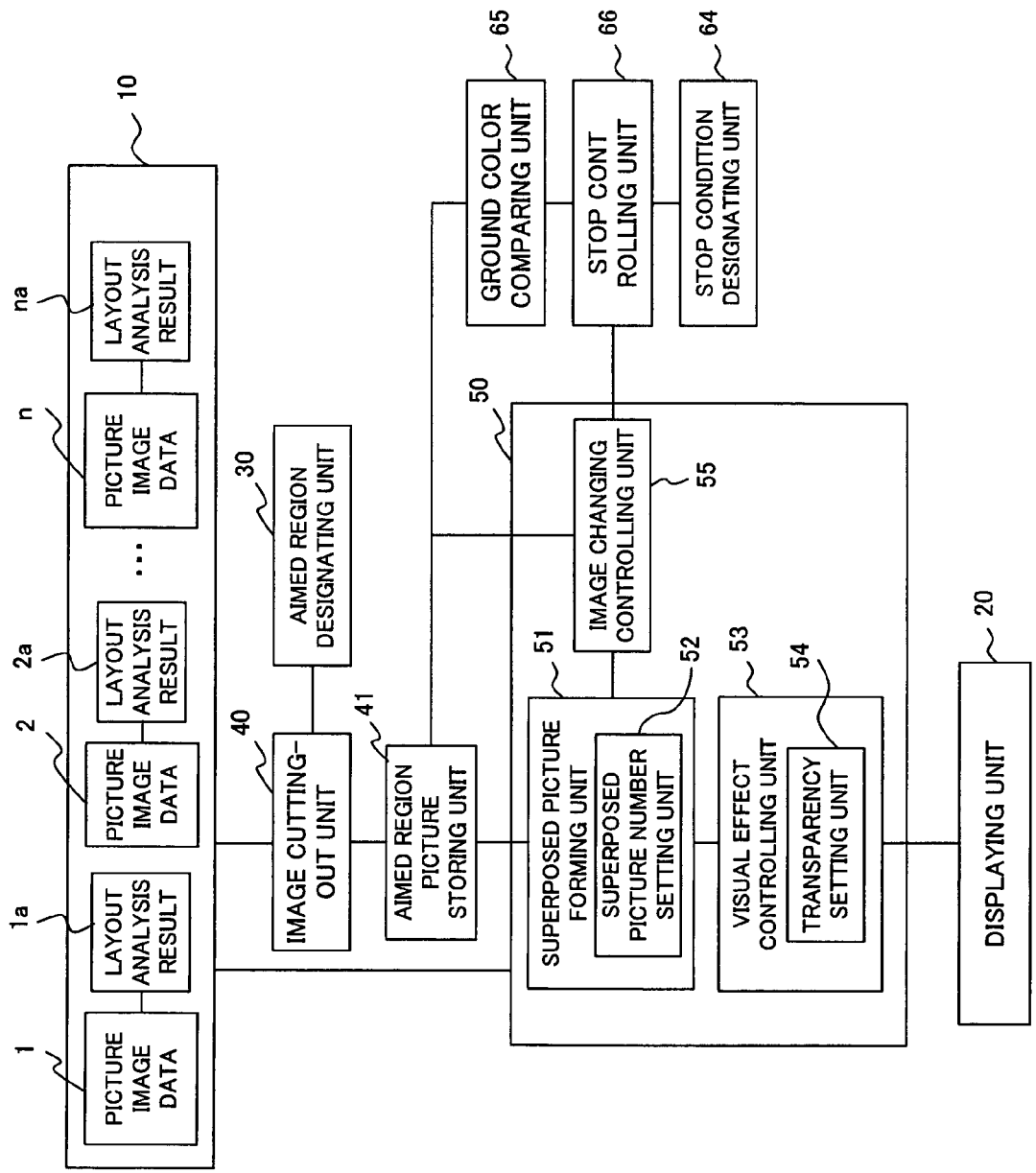
FIG. 17 is a block diagram showing a structure of a picture displaying apparatus according to a fourth embodiment of this invention.

Next, description will be made of a picture displaying apparatus and a picture displaying method according to a fourth embodiment of this invention. FIG. 17 is a block diagram showing a structure of the picture displaying apparatus according to this embodiment. As shown in FIG. 17, the picture displaying apparatus according to this embodiment further includes a stop condition designating unit 64, a ground color comparing unit 65 and a stop controlling unit 66 as compared with the picture displaying apparatus according to the first embodiment shown in FIG. 2. The other units are similar to those of the picture displaying apparatus according to the first embodiment. In FIG. 17, like reference characters designate like or corresponding parts, detailed description of which are thus omitted. In FIG. 17, illustration of the image changing frequency designating unit 56, the image changing speed designating unit 57, the stop instructing unit 58 and the page-turning instructing unit 59 of the picture displaying apparatus according to this embodiment are omitted, for the sake of simplification.

The stop condition designating unit 64 designates the rate of change in the ground color of aimed region pictures forming the superposed picture 51A. The stop condition designating unit 64 designates the upper limit of the rate of change in the ground color of an aimed region picture added to the superposed picture 51A this time to an aimed region picture added to the superposed picture 51A the last time.

The ground color comparing unit 65 detects (extracts) the ground color change rate of an aimed region picture added to the superposed picture 51A this time to an aimed region added to the superposed picture 51A the last time, and compares the detected change rate with the upper limit value (predetermined value) of the change rate set by the stop condition designating unit 64. When the change rate is larger than the upper limit value, the ground color comparing unit 65 determines that the stop condition is established.

When the ground color comparing unit 65 determines that the stop condition is established, the stop controlling unit 66 makes the image changing controlling unit 55 stop changing of the superposed picture 51A at the point of time that the so-determined aimed region picture is displayed on the superposed picture 51A, and instructs the image changing controlling unit 55 to display the picture of that aimed region picture on the displaying unit 20.

Figure 18:
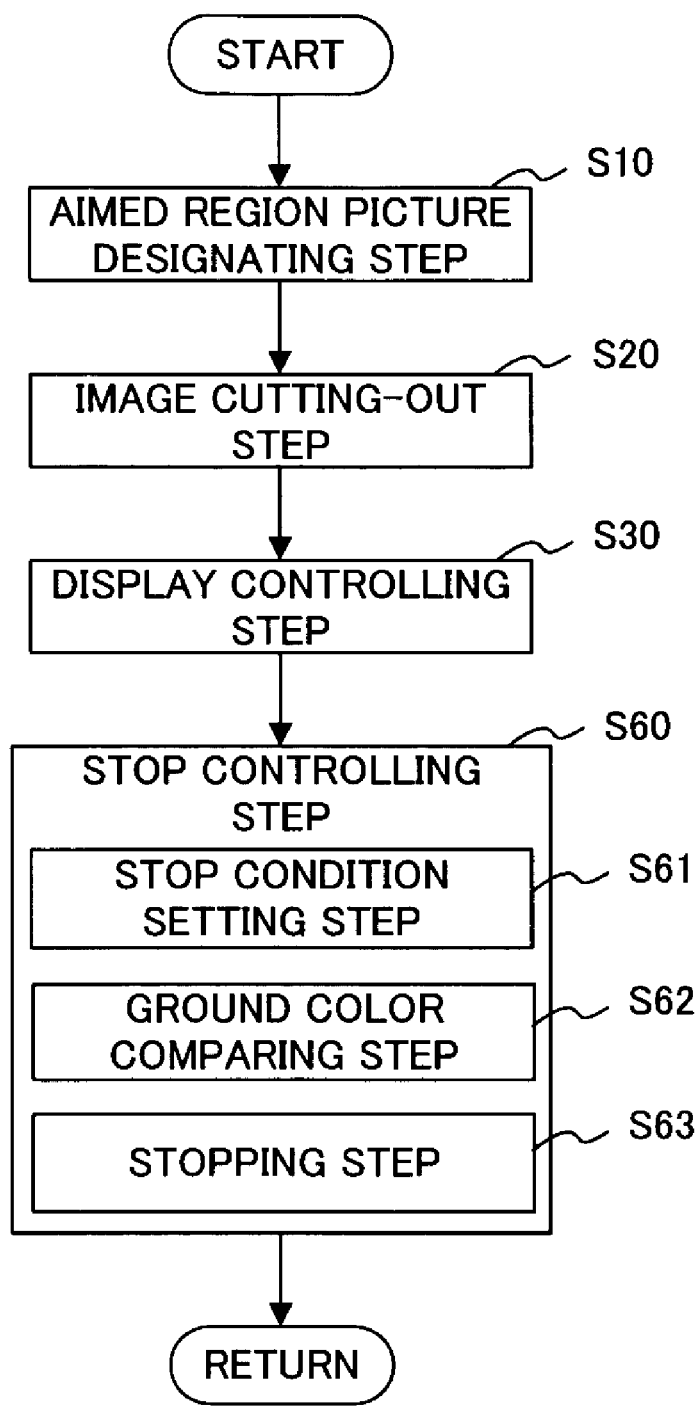
FIG. 18 is a flowchart for illustrating a procedure of a picture displaying method according to the fourth embodiment of this invention.

Next, description will be made of the picture displaying method according to this embodiment. FIG. 18 is a flowchart for illustrating a procedure of the picture displaying method according to this embodiment. As shown in FIG. 18 (steps S10 to S60), the picture displaying method of this embodiment is configured by adding, to the picture displaying method according to the first embodiment shown in FIG. 6, a stop controlling step S60 of stopping changing of the superposed picture 51A at the display controlling step S30 when an aimed region picture satisfying a predetermined stop condition is detected, and displaying a picture of that aimed region picture on the displaying unit 20. In FIG. 18, like reference characters designate like or corresponding parts, detailed descriptions of which are thus omitted. Additionally, the display controlling step S30 is simplified and shown, for the sake of simplification.

The stop controlling step S60 includes a stop condition setting step S61, a ground color comparing step S62 and a stopping step S63.

At the stop controlling step S60, the stop condition setting unit 64 designates the upper limit value of the ground color change rate of a characteristic part (aimed region) of a picture to be retrieved as the stop condition at the stop condition setting step S61 in order to retrieve the picture that is a target in retrieval.

At the ground color comparing step S62, the ground color comparing unit 65 determines whether the stop condition is established or not on the basis of the stop condition set at the stop condition setting step S61 and the ground color change rate of each aimed region picture.

Figure 19:
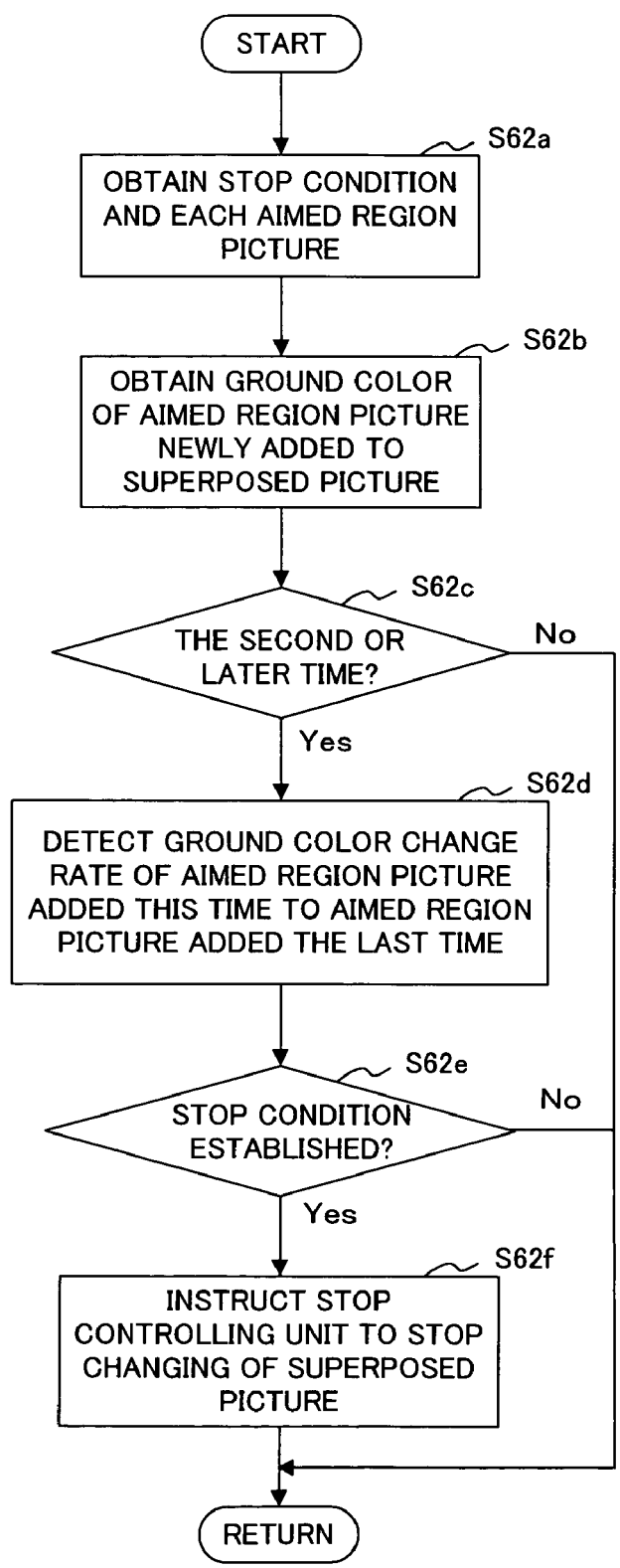
FIG. 19 is a flowchart of illustrating a ground color comparing step of the picture displaying method according to the fourth embodiment of this invention.

FIG. 19 is a flowchart for illustrating a procedure at the ground color comparing step S62 in the picture displaying method according to this embodiment. As shown in FIG. 19 (steps S62a to S62f), at the ground color comparing step S62, the ground color comparing unit 65 obtains the stop condition set at the stop condition setting step S61 and each aimed region picture (step S62a).

The ground color comparing unit 65 obtains the ground color of the aimed region picture, using the technique as described in Japanese Patent Laid-Open No. HEI 11-096362 made by this applicant, for example (step S62b).

The ground color comparing unit 65 then determines whether detection of the ground color on this occasion is the second or later time (step S62c). When this detection is not the second or later time, that is, when this detection is the first time (No route at step S62c), the process at the ground color comparing step S62 is terminated.

When detection of the ground color on this occasion is the second or later time (Yes route at step S62c), the change rate in the ground color of an aimed region picture added to the superposed picture 51A this time to an aimed region picture added to the superposed picture 51A the last time is detected (step S62d).

It is then determined whether a result of the detection is not less than the upper limit value of the change rate set as the stop condition or not, that is, whether the stop condition is established or not (step S62e). When the stop condition is established (Yes route at step S62e), the ground color comparing unit 65 instructs the stop controlling unit 63 to stop changing of the superposed picture 51A by the image changing controlling unit 55 at the point of time that the aimed region picture satisfying the stop condition is displayed on the superposed picture 51A (step S62f).

When the stop condition is not established (No route at step S62e), the process at the ground color comparing step S62 is terminated.

When the stop condition is established at the ground color comparing step S62, the stop controlling unit 66 stops changing of the superposed picture 51A by the image changing controlling unit 55 at the stopping step S63, and displays the picture of the aimed region picture satisfying the stop condition on the displaying unit 20.

According to the fourth embodiment of this invention, the picture displaying apparatus and the picture displaying method can provide the same effect as the above first embodiment. According to the fourth embodiment, the ground color change rate of a characteristic part (aimed region) of a picture to be retrieved is set as the stop condition, changing of the superposed picture 51A is stopped when an aimed region picture satisfying the stop condition is determined, and the picture of that aimed region picture is displayed on the displaying unit 20. Accordingly, automatic retrieval becomes feasible by setting the stop condition, which further improves the retrieval efficiency. The fourth embodiment is particularly suitable for use to the picture confirming client 104 described above with reference to FIG. 1. In other words, the fourth embodiment is suitable for use to confirm whether a picture in a difference form that is not to be retrieved is included in a plurality of pictures in the same or almost the same form.

As a modification of this embodiment, the ground color information may be beforehand retained in the layout analysis results 1$a$, 2$a$, . . . , and na of the storing unit 10, and the ground color comparing unit 62 (ground color comparing step S62) may obtain the ground color information on each of aimed region pictures from the layout analysis results 1$a$, 2$a$, . . . , and na.

[5] Others

Note that the present invention is not limited to the above examples, but may be modified in various ways without departing from the scope of the invention.

For example, the visual effect controlling unit may expand each of aimed region pictures forming the superposed picture 51A at the same transparency in the corresponding layer, in the above embodiments. When the image changing controlling unit 55 changes the aimed region pictures forming the superposed picture 51A, a new aimed region picture may be added, and the oldest aimed region picture may be simply discarded with the layers on which the aimed region pictures are expanded not moved, that is, without stepwisely shifting the layers of the aimed region pictures forming the superposed picture 51A at this point of time.

Functions of the aimed region designating unit 30, the image cutting-out unit 40, the aimed region picture storing unit 41, the display controlling unit 50, the image changing frequency designating unit 56, the image changing speed designating unit 57, the stop instructing unit 58, the page-turning instructing unit 59, the stop condition setting units 61 and 64, the image recognizing unit 62, the stop controlling units 63 and 66, the ground color comparing unit 65 and the temporarily storing instructing unit 81 are implemented by executing a predetermined application program (picture displaying program) by a computer (including a CPU, an information processing unit, various terminals).

This program is provided in a form that the program is stored in, for example, a computer readable record medium such as a flexible disk, a CD-ROM, a CD-R, a CD-RW, a DVD or the like. In which case, the computer reads out the picture displaying program from the record medium, transfers the program to an internal storage unit or an external storage unit to store the program therein, and uses the program. Alternatively, the program may be recorded on a storage (record medium) such as a magnetic disk, an optical disk, a magneto-optical disk or the like, and provided to the computer from the storage over a communication line, for example.

Here, the computer is a concept including hardware and an OS (operating system), which signifies hardware that operates under a control of the OS. When the OS is not required and the application program solely operates the hardware, the hardware itself corresponds to the computer.

The hardware has at least a microprocessor such as a CPU or the like, and a means for reading out the computer program recorded on the record medium. The application program as being the above picture displaying program includes program codes for allowing the computer to implement functions as the aimed region designating unit 30, the image cutting-out unit 40, the aimed region picture storing unit 41, the display controlling unit 50, the image changing frequency designating unit 56, the image changing speed designating unit 57, the stop instructing unit 58, the page-turning instructing unit 59, the stop condition setting units 61 and 64, the image recognizing unit 62, the stop controlling units 63 and 66, the ground color comparing unit 65, and the temporarily storing instructing unit 81. A part of the functions may be implemented, not by the application program, but by the OS.

As the record medium in the above embodiments, it is possible to use various medium which can be read out by a computer such as an IC card, a ROM cartridge, a magnetic tape, a punched card, an internal storage of a computer (storage such as RAM, ROM or the like), an external storage, a printed matter on which codes such as bar codes are printed, etc., other than the above flexible disk, CD-ROM, CD-R, CD-RW, DVD, magnetic disk, optical disk and magneto-optic disk.

What is claimed is:

1. A picture displaying apparatus comprising:

a storing unit for storing a plurality of pictures having a visually same or almost same form;

a displaying unit for displaying at least one picture among said plurality of pictures;

an aimed region designating unit for designating a partial region on a picture as an aimed region;

an image cutting-out unit for cutting out a same predetermined region corresponding to said aimed region on said picture designated by said aimed region designating unit as an aimed region picture from each of said plurality of pictures;

a display controlling unit for displaying said aimed region pictures of said plurality of pictures cut out by said image cutting-out unit on said displaying unit;

said display controlling unit comprising:

a superposed picture forming unit for forming a superposed picture by successively superposing a plurality of said aimed region pictures of each of said plurality of pictures cut out by said image cutting-out unit; and a visual effect controlling unit for displaying, on said displaying unit, each of said aimed region pictures forming said superposed picture at a predetermined transparency and as each of said aimed region pictures are successively superposed in layers from rearmost to foremost, so that the successively superposed aimed region pictures are displayed on the display unit as successively changing aimed region pictures, wherein said plurality of pictures includes at least three pictures, and the predetermined transparencies of the aimed region pictures increases, respectively, as the aimed region pictures are in layers from rearmost to foremost, respectively.

2. The picture displaying apparatus according to claim 1, wherein item information contained in each of said plurality of pictures is stored together with said plurality of pictures in said storing unit.

3. The picture displaying apparatus according to claim 2, wherein said aimed region designating unit designates a partial region corresponding to said item information in each of said plurality of pictures as said aimed region.

4. The picture displaying apparatus according to claim 2, wherein said aimed region designating unit designates said aimed region on the basis of said item information contained in or in proximity to said partial region on said picture.

5. The picture displaying apparatus according to claim 1, wherein
edge positions of each of said plurality of pictures are stored together with said plurality of pictures in said storing unit;
said aimed region designating unit designates the partial region on said picture as said aimed region on the basis of said edge positions; and
said image cutting-out unit cuts out said aimed region picture on the basis of said edge positions.

6. The picture displaying apparatus according to claim 1, wherein said superposed picture forming unit forms said superposed picture by superposing a predetermined number of said aimed region pictures expanded in different layers, respectively.

7. The picture displaying apparatus according to claim 6, wherein said superposed picture forming unit comprises a superposed picture number setting unit for setting the number of said aimed region pictures forming said superposed picture.

8. The picture displaying apparatus according to claim 6, wherein said display controlling unit comprises an image changing controlling unit for changing said aimed region pictures forming said superposed picture by adding a new aimed region picture to said superposed picture and discarding the oldest aimed region picture among said plurality of aimed region pictures forming said superposed picture.

9. The picture displaying apparatus according to claim 8 further comprising:
an image changing frequency designating unit for setting the number of said aimed region pictures to be successively changed by said image changing controlling unit.

10. The picture displaying apparatus according to claim 8, wherein, when said image changing controlling unit changes said aimed region pictures forming said superposed picture, said image changing controlling unit adds a new aimed region picture and changes step-wisely the layer of each of said aimed region pictures forming said superposed picture; and
said visual effect controlling unit displays each of said aimed region pictures at a predetermined transparency in a corresponding layer.

11. The picture displaying apparatus according to claim 10, wherein said visual effect controlling unit sets step-wisely the transparency of each of said aimed region pictures according to a corresponding layer.

12. The picture displaying apparatus according to claim 8 further comprising:
a picture specifying instructing unit for stopping changing of said aimed region pictures forming said superposed picture by said image changing controlling unit, and controlling to display a desired aimed region picture on said displaying unit.

13. The picture displaying apparatus according to claim 1, wherein said visual effect controlling unit enlarges said superposed picture and displays the same on said displaying unit.

14. The picture displaying apparatus according to claim 8 further comprising:

a stop controlling unit for stopping changing of said aimed region pictures in said superposed picture by said image changing controlling unit when a predetermined stop condition beforehand set is established.

15. The picture displaying apparatus according to claim 14, wherein said stop condition is that character information contained in said aimed region satisfies a predetermined condition.

16. A picture displaying method for displaying a picture on a displaying unit in a picture displaying apparatus comprising a storing unit for storing a plurality of pictures having a visually same or almost same form and said displaying unit for displaying at least one picture among said plurality of pictures, said picture displaying method comprising the steps of:
an aimed region designating step of designating a partial region on a picture as an aimed region;
an image cutting-out step of cutting out a same predetermined region corresponding to said aimed region on said picture designated at said aimed region designating step as an aimed region picture from each of said plurality of pictures;
a display controlling step of displaying said aimed region pictures of said plurality of pictures cut out at said image cutting-out step on said displaying unit;
said displaying controlling step comprising:
a superposed picture forming step of forming a superposed picture by successively superposing a plurality of said aimed region pictures of each of said plurality of pictures cut out at said image cutting-out step in layers from rearmost to foremost; and
a visual effect controlling step of displaying, on said displaying unit, each of said aimed region pictures forming said superposed picture at a predetermined transparency and as each of said aimed region pictures are successively superposed, so that the successively superposed aimed region pictures are displayed on the display unit as successively changing aimed region pictures, wherein said plurality of pictures includes at least three pictures, and the predetermined transparencies of the aimed region pictures increases, respectively, as the aimed region pictures are in layers from rearmost to foremost, respectively.

17. The picture displaying method according to claim 16, wherein
said superposed picture forming step is a step of forming said superposed picture by superposing a predetermined number of said aimed region pictures expanded in different layers, respectively; and
said display controlling step comprises an image changing controlling step of changing said aimed region pictures forming said superposed picture by adding a new aimed region picture to said superposed picture and discarding the oldest aimed region picture among said plurality of aimed region pictures forming said superposed picture.

18. The picture displaying method according to claim 17, wherein, when said aimed region pictures forming said superposed picture are changed at said image changing controlling step, a new aimed region picture is added, and the layer of each of said aimed region pictures forming said superposed picture is step-wisely changed; and
a transparency of each of said aimed region pictures is step-wisely set according to a corresponding layer at said visual effect controlling step.

19. A picture displaying program for making a computer execute a function of displaying a picture on a displaying unit in a picture displaying apparatus comprising a storing unit for storing a plurality of pictures having a visually same or almost same form and said displaying unit for displaying at least one picture among said plurality of pictures, said picture displaying program making said computer function as:

an aimed region designating unit for designating a partial region on a picture as an aimed region;

an image cutting-out unit for cutting out a same predetermined region corresponding to said aimed region on said picture designated by said aimed region designating unit as an aimed region picture from each of said plurality of pictures;

a display controlling unit for displaying said aimed region pictures of said plurality of pictures cut out by said image cutting-out unit on said displaying unit;

when said picture displaying program makes said computer function as said display controlling unit, said picture displaying program making said computer function as:

a superposed picture forming unit for forming a superposed picture by successively superposing a plurality of said aimed region pictures of each of said plurality of pictures cut out by said image cutting-out unit in layers from rearmost to foremost; and a visual effect controlling unit for displaying, on said displaying unit, each of said aimed region pictures forming said superposed picture at a predetermined transparency and as each of said aimed region pictures are successively superposed, so that the successively superposed aimed region pictures are displayed on the display unit as successively changing aimed region pictures, wherein said plurality of pictures includes at least three pictures, and the predetermined transparencies of the aimed region pictures increases, respectively, as the aimed region pictures are in layers from rearmost to foremost, respectively.

20. A computer readable record medium containing a picture displaying program for making a computer execute a function of displaying a picture on a displaying unit in a picture displaying apparatus comprising a storing unit for storing a plurality of pictures having a visually same or almost same form and said displaying unit for displaying at least one picture among said plurality of pictures, said picture displaying program making said computer function as:

an aimed region designating unit for designating a partial region on a picture as an aimed region;

an image cutting-out unit for cutting out a same predetermined region corresponding to said aimed region on said picture designated by said aimed region designating unit as an aimed region picture from each of said plurality of pictures;

a display controlling unit for displaying said aimed region pictures of said plurality of pictures cut out by said image cutting-out unit on said displaying unit;

when said picture displaying program makes said computer function as said display controlling unit, said picture displaying program making said computer function as:

a superposed picture forming unit for forming a superposed picture by successively superposing a plurality of said aimed region pictures of each of said plurality of pictures cut out by said image cutting-out unit in layers from rearmost to foremost; and a visual effect controlling unit for displaying, on said displaying unit, each of said aimed region pictures forming said superposed picture at a predetermined transparency and as each of said aimed region pictures are successively superposed, so that the successively superposed aimed region pictures are displayed on the display unit as successively changing aimed region pictures, wherein said plurality of pictures includes at least three pictures, and the predetermined transparencies of the aimed region pictures increases, respectively, as the aimed region pictures are in layers from rearmost to foremost, respectively.

21. A method comprising:

designating a partial region on a picture as an aimed region;

cutting out a same predetermined region corresponding to the aimed region as an aimed region picture from each of a plurality of pictures, to thereby provide a plurality of aimed region pictures;

successively superposing the plurality of aimed region pictures in layers from rearmost to foremost; and displaying each of the aimed region pictures at a predetermined transparency for the respective aimed region picture and as each of the aimed region pictures are successively superposed in layers from rearmost to foremost, so that the successively superposed aimed region pictures are displayed as successively changing aimed region pictures, wherein the plurality of pictures includes at least three pictures, and the predetermined transparencies of the aimed region pictures increases, respectively, as the aimed region pictures are in layers from rearmost to foremost, respectively.

22. A method as in claim 21, wherein each of the plurality of pictures has a visually same or almost same form.

23. An apparatus comprising:

means for designating a partial region on a picture as an aimed region;

means for cutting out a same predetermined region corresponding to the aimed region as an aimed region picture from each of a plurality of pictures, to thereby provide a plurality of aimed region pictures;

means for successively superposing the plurality of aimed region pictures in layers from rearmost to foremost; and means for displaying each of the aimed region pictures at a predetermined transparency for the respective aimed region picture and as each of the aimed region pictures are successively superposed, so that the successively superposed aimed region pictures are displayed as successively changing aimed region pictures, wherein the plurality of pictures includes at least three pictures, and the predetermined transparencies of the aimed region pictures increases, respectively, as the aimed region pictures are in layers from rearmost to foremost, respectively.

24. An apparatus as in claim 23, wherein each of the plurality of pictures has a visually same or almost same form.

* * * * *